US012784501B2

(12) United States Patent
Ishida et al.

(10) Patent No.: US 12,784,501 B2
(45) Date of Patent: Nov. 3, 2026

(54) NON-TRANSITORY COMPUTER-READABLE RECORDING MEDIUM, INFORMATION PROCESSING METHOD, AND INFORMATION PROCESSING APPARATUS

(71) Applicant: FUJITSU LIMITED, Kawasaki (JP)

(72) Inventors: Ryo Ishida, Kawasaki (JP); Takahiro Saito, Asaka (JP); Shun Kohata, Setagaya (JP); Sho Iwasaki, Yokohama (JP); Yuka Jo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 621 days.

(21) Appl. No.: 17/946,173

(22) Filed: Sep. 16, 2022

(65) Prior Publication Data

US 2023/0206693 A1 Jun. 29, 2023

(30) Foreign Application Priority Data

Dec. 28, 2021 (JP) ................................ 2021-215310

(51) Int. Cl.
*G06K 9/00* (2022.01)
*G06V 10/44* (2022.01)
(Continued)

(52) U.S. Cl.
CPC .............. *G06V 40/20* (2022.01); *G06V 10/44* (2022.01); *G06V 10/765* (2022.01); *G06V 20/41* (2022.01); *G06V 40/176* (2022.01)

(58) Field of Classification Search
CPC ....... G06V 40/20; G06V 10/765; G06V 10/82
See application file for complete search history.

(56) References Cited

U.S. PATENT DOCUMENTS 10,546,197 B2 1/2020 Shrestha et al.
10,733,457 B1 8/2020 Agnihotram et al.
(Continued)

FOREIGN PATENT DOCUMENTS

CN 110378281 A 10/2019
CN 112668384 A * 4/2021
(Continued)

OTHER PUBLICATIONS

Gkioxari, G., Girshick, R., Dollár, P., & He, K. (2018). Detecting and recognizing human-object interactions. In Proceedings of the IEEE conference on computer vision and pattern recognition (pp. 8359-8367). (Year: 2018).*
(Continued)

*Primary Examiner* — Molly Wilburn
*Assistant Examiner* — Aidan Keup
(74) *Attorney, Agent, or Firm* — Fujitsu Intellectual Property Center

(57) ABSTRACT

An information processing apparatus acquires video data that includes target objects including a person and an object, and identifies a relationship between the target objects in the acquired video data, by inputting the acquired video data to a first machine learning model. The information processing apparatus identifies a behavior of the person in the video data by using a feature value of the person included in the acquired video data. The information processing apparatus predicts one of a future behavior and a future state of the person by comparing the identified behavior of the person and the identified relationship with a behavior prediction rule that is set in advance.

10 Claims, 23 Drawing Sheets

(51) Int. Cl.

| | |
|---|---|
| ***G06V 10/764*** | (2022.01) |
| ***G06V 20/40*** | (2022.01) |
| ***G06V 40/16*** | (2022.01) |
| ***G06V 40/20*** | (2022.01) |

(56) References Cited

U.S. PATENT DOCUMENTS

| | | | | |
|---|---|---|---|---|
| 2016/0092727 | A1 | 3/2016 | Ren et al. | |
| 2018/0314897 | A1 | 11/2018 | Camilus et al. | |
| 2019/0095716 | A1 | 3/2019 | Shrestha et al. | |
| 2020/0057965 | A1 * | 2/2020 | Howard | A61P 25/28 |
| 2020/0151585 | A1 | 5/2020 | Ishida | |
| 2020/0188736 | A1 | 6/2020 | Naito et al. | |
| 2021/0216821 | A1 | 7/2021 | Uchida et al. | |
| 2021/0286981 | A1 | 9/2021 | Fuji | |
| 2021/0312321 | A1 | 10/2021 | Deng et al. | |
| 2021/0313041 | A1 | 10/2021 | Keene et al. | |
| 2022/0172126 | A1 | 6/2022 | Howard | |
| 2022/0207920 | A1 | 6/2022 | Cho et al. | |
| 2022/0307231 | A1 * | 9/2022 | Hunsballe | G05D 1/2285 |
| 2022/0414366 | A1 | 12/2022 | Zotto | |
| 2023/0206640 | A1 | 6/2023 | Fujimoto et al. | |

FOREIGN PATENT DOCUMENTS

| | | | | | |
|---|---|---|---|---|---|
| JP | 2000-293685 | | | 10/2000 | |
| JP | 2017-121017 | | | 7/2017 | |
| JP | 2020-071665 | A | | 5/2020 | |
| JP | 2020-077343 | A | | 5/2020 | |
| JP | 2021-111114 | A | | 8/2021 | |
| KR | 20210053534 | A | * | 5/2021 | G06V 40/20 |
| WO | 2019/049216 | A1 | | 3/2019 | |
| WO | 2019/235050 | | | 12/2019 | |
| WO | WO-2019235350 | A1 | * | 12/2019 | |

OTHER PUBLICATIONS

EPOA—European Office Action mailed on Apr. 17, 2024 for European Patent Application No. 22195813.5 [10 pages].

X. Truong et al., "Social interactive intention prediction and categorization", IEEE ICRA 2019 Workshop: Mobile Robot Assistants for the Elderly (MoRobAE), May 23, 2019, XP93148951, Online Retrieved from the Internet: https://morobae.github.io/papers/morobae_p12_truong.pdf [Retrieved on Apr. 8, 2024].

European Extended Search Report date Jan. 30, 2023 for corresponding European Patent Application No. 22195813.5, 13 pages.

Sun, Chen et al., "Relational Action Forecasting", arXiv.ORG, Cornell University Library, arXiv:1904.04231v1[cs.CV], Apr. 8, 2019, 13 pages, XP081166641.

Sumer, Omer et al., "Estimating Presentation Competence using Multimodal Nonverbal Behavioral Cues", arXiv.ORG, Cornell University Library, arXiv:2105.02636v1[cs.CV], May 6, 2021, 22 pages, XP081959033.

EPOA—Office Action mailed on Oct. 11, 2023 for corresponding European patent application No. 22197101.3 [8 pages].

EESR—Extended European Search Report mailed on Feb. 9, 2023 for corresponding European patent application No. 22197101.3 [13 pages].

Panagiotis P. Filntisis et al., "Fusing Body Posture with Facial Expressions for Joint Recognition of Affect in Child-Robot Interaction", Jan. 7, 2019, 10 pages.

USPTO—Non-Final Office Action mailed Dec. 20, 2024 for U.S. Appl. No. 17/952,311 [26 pages].

USOA—Final Office Action mailed on Jun. 30, 2025 for related U.S. Appl. No. 17/952,311 (41 pages). Non-Patent Literature by Gkiozari, G et al., was previously cited on Mar. 17, 2025. US20220172126A1 was previously submitted in IDS filed on May 1, 2025.

JPOA—Office Action of Japanese Patent Application No. 2021-215310 mailed on Jun. 24, 2025, with English translation (5 pages).

JPOA—Office Action of Japanese Patent Application No. 2021-215309 mailed on Jun. 24, 2025, with English translation (5 pages).

USPTO, Non-Final Office Action mailed Nov. 17, 2025 for related U.S. Appl. No. 17/952,311 (22 pages). All remaining U.S. References and Non-Patent Literature Document by Gkioxari et al., cited in the Non-Final Office Action were previously submitted or cited, therefore they are not submitted in this IDS.

Uiseo Nam et al., "Analyzing Facial and Eye Movements to Screen for Alzheimer's Disease", Sensors 2020, 20, 5349.

USPTO—Notice of Allowance mailed on Jun. 2, 2026 for co-pending U.S. Appl. No. 17/952,311.

* cited by examiner

FIG.3

| | NEXT FEW SECONDS TO NEXT FEW MINUTES | TO NEXT FEW HOURS | TO NEXT FEW DAYS | LONG-TERM TO NEXT FEW MONTHS |
|---|---|---|---|---|
| USE CASE | ·HUMAN SUPPORT BY ROBOT<br>·ONLINE COMMUNICATION SUPPORT | ·PURCHASE BEHAVIOR IN STORE<br>·SHOPLIFTING (CRIME)<br>·SUICIDE | ·POLICE BOX ATTACK<br>·DOMESTIC VIOLENCE | ·IMPROVEMENT IN GRADE OF STUDY<br>·ALZHEIMER (PREDICTION OF DISEASE) |

FIG.5

| FACIAL EXPRESSION | ESTIMATION RESULT |
|---|---|
| SMILE | AU1:2, AU2:5, AU3:0, ··· |
| ANGRY FACE | AU1:5, AU2:3, AU3:1, ··· |
| ··· | ··· |

FIG.6

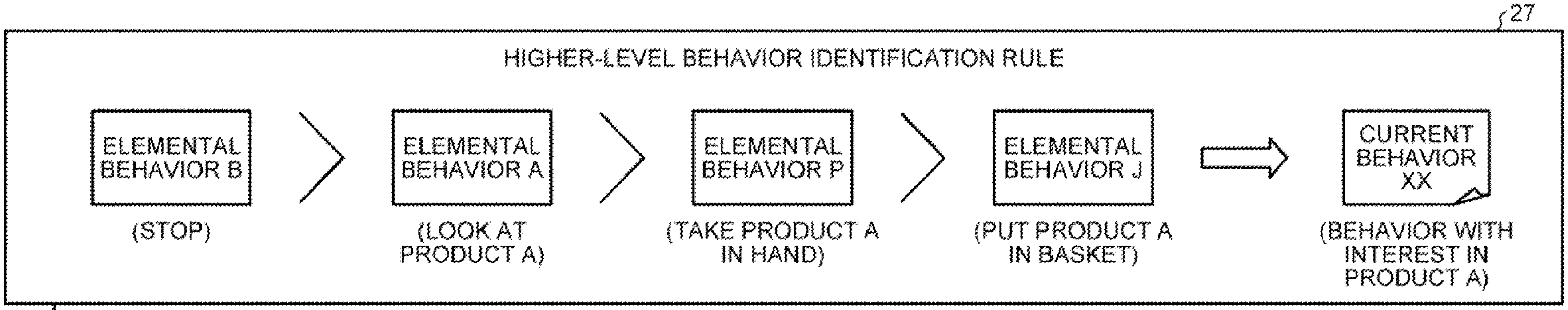

| ELEMENTAL BEHAVIOR | BASIC ACTION | FACIAL EXPRESSION |
|---|---|---|
| ELEMENTAL BEHAVIOR B | TIME SERIES PATTERN IN PERIOD FROM TIME t1 TO TIME t3<br>·BASIC ACTION OF WHOLE BODY 02→03→03<br>·BASIC ACTION OF RIGHT ARM 27→25→25<br>·BASIC ACTION OF FACE 48→48→48 | TIME SERIES PATTERN IN PERIOD FROM TIME t1 TO TIME t3<br>·CONTINUATION OF FACIAL EXPRESSION H |
| ELEMENTAL BEHAVIOR A | TIME SERIES PATTERN IN PERIOD FROM TIME t4 TO TIME t7<br>·BASIC ACTION OF RIGHT ARM 25→25→26→26→23 | TIME SERIES PATTERN IN PERIOD FROM TIME t4 TO TIME t7<br>·CHANGE FROM FACIAL EXPRESSION H TO FACIAL EXPRESSION I |
| ... | ... | ... |

FIG.7

| RELATIONSHIP \ CURRENT BEHAVIOR | HOLDING PRODUCT A IN HAND | PRESENT IN FRONT OF PRODUCT SHELF | LOOK AROUND | … | FOLLOW | … |
|---|---|---|---|---|---|---|
| HOLD | PURCHASE PRODUCT A TEN MINUTES LATER THAN NOW | RETURN PRODUCT A TO PRODUCT SHELF | SHOPLIFTING | … | - | … |
| PUT IN BASKET | MOVE TO FOOD SECTION | … | … | … | - | … |
| … | … | … | … | … | … | … |
| STALKING | - | - | - | … | ATTACK PERSON | … |
| … | … | … | … | … | … | … |

(-: NOT APPLICABLE (EXCLUDED FROM TARGETS))

NON-TRANSITORY COMPUTER-READABLE RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-215310, filed on Dec. 28, 2021, the entire contents of which are incorporated herein by reference.

FIELD

The embodiments discussed herein are related to a computer-readable recording medium, an information processing method, and an information processing apparatus.

BACKGROUND

A behavior recognition technology for recognizing a behavior of a person from video data is known. For example, a technology for recognizing, from video data that is captured by a camera or the like, an action or a behavior performed by a person by using skeleton information on the person in the video data is known. In recent years, with the spread of self-checkout in a supermarket or a convenience store or the spread of a monitoring camera in a school, a train, a public facility, or the like, human behavior recognition is actively introduced.

Patent Document 1: International Publication Pamphlet No. 2019/049216

SUMMARY

According to still another aspect of an embodiment, a non-transitory computer-readable recording medium stores therein an information processing program that causes a computer to execute a process. The process includes acquiring video data that includes target objects including a person and an object, first identifying a relationship between the target objects in the acquired video data, by inputting the acquired video data to a first machine learning model, second identifying a behavior of the person in the video data by using a feature value of the person included in the acquired video data, and predicting one of a future behavior and a future state of the person by comparing the identified behavior of the person and the identified relationship with a behavior prediction rule that is set in advance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for explaining specific examples of the behavior prediction;

FIG. 5 is a diagram illustrating an example of a facial expression recognition rule;

FIG. 6 is a diagram illustrating an example of a higher-level behavior identification rule;

FIG. 7 is a diagram illustrating an example of a behavior prediction rule;

DESCRIPTION OF EMBODIMENTS

However, a behavior of a person that is recognized by the behavior recognition technology as described above indicates a behavior that is currently performed or that was performed in the past by the person. Therefore, in some cases, even if a countermeasure is taken after recognition of a predetermined behavior performed by the person, it may be too late to take the countermeasure.

Preferred embodiments will be explained with reference to accompanying drawings. The present invention is not limited by the embodiments below. In addition, the embodiments may be combined appropriately as long as no contradiction is derived.

[a] First Embodiment

Overall Configuration

Figure 1:
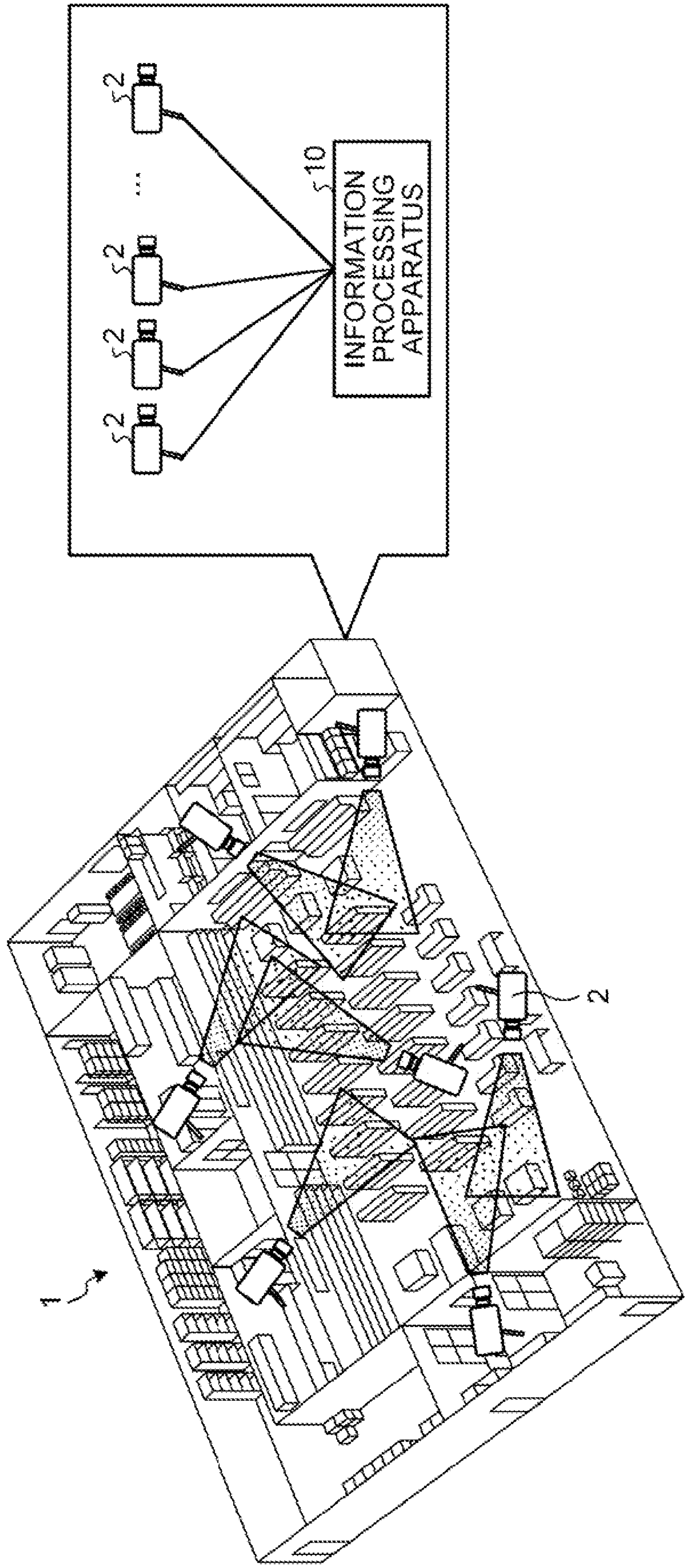
FIG. 1 is a diagram illustrating an overall configuration example of a behavior prediction system according to a first embodiment.

FIG. 1 is a diagram illustrating an overall configuration example of a behavior prediction system according to a first embodiment. As illustrated in FIG. 1, the behavior prediction system includes a store 1 that is one example of a space, a plurality of cameras 2 that are installed in different places in the store 1, and an information processing apparatus 10 that analyzes video data.

Each of the cameras 2 is one example of a monitoring camera that captures an image of a predetermined area in the store 1, and transmits data of a captured video to the information processing apparatus 10. In the following descriptions, the data of the video may be referred to as "video data". Further, the video data includes a plurality of frames in chronological order. A frame number is assigned to each of the frames in ascending chronological order. Each of the frames is image data of a still image that is captured by each of the cameras 2 at a certain timing.

The information processing apparatus 10 is one example of a computer that analyzes each piece of image data captured by each of the cameras 2. Meanwhile, each of the cameras 2 and the information processing apparatus 10 are connected to each other by using various networks, such as the Internet or a dedicated line, regardless of whether the networks are wired or wireless.

In recent years, monitoring cameras are set not only in the store 1, but also in town, station platforms, and the like, and various services are provided to realize a safe and secure society by using video data acquired by the monitoring cameras. For example, services for detecting an occurrence of shoplifting, an occurrence of an accident, an occurrence of a suicide by jumping, or the like, and using the detection for dealing with aftermath are provided. However, all of the services that are currently provided cope with post-detection, and, from the viewpoint of prevention, video data is not effectively used for a sign of shoplifting, a possibility of a suspicious person, a sign of a sudden attack of illness, a sign of dementia, Alzheimer, or the like that can hardly be determined at first glance.

To cope with this, in the first embodiment, the information processing apparatus 10 that implements "behavior prediction" to predict a future behavior or a future internal state of a person by combining a "behavior analysis" for analyzing a current facial expression and a current behavior of the person and "context sensing" for detecting a surrounding environment, an object, and a relationship with the environment or the object will be described.

Figure 2:
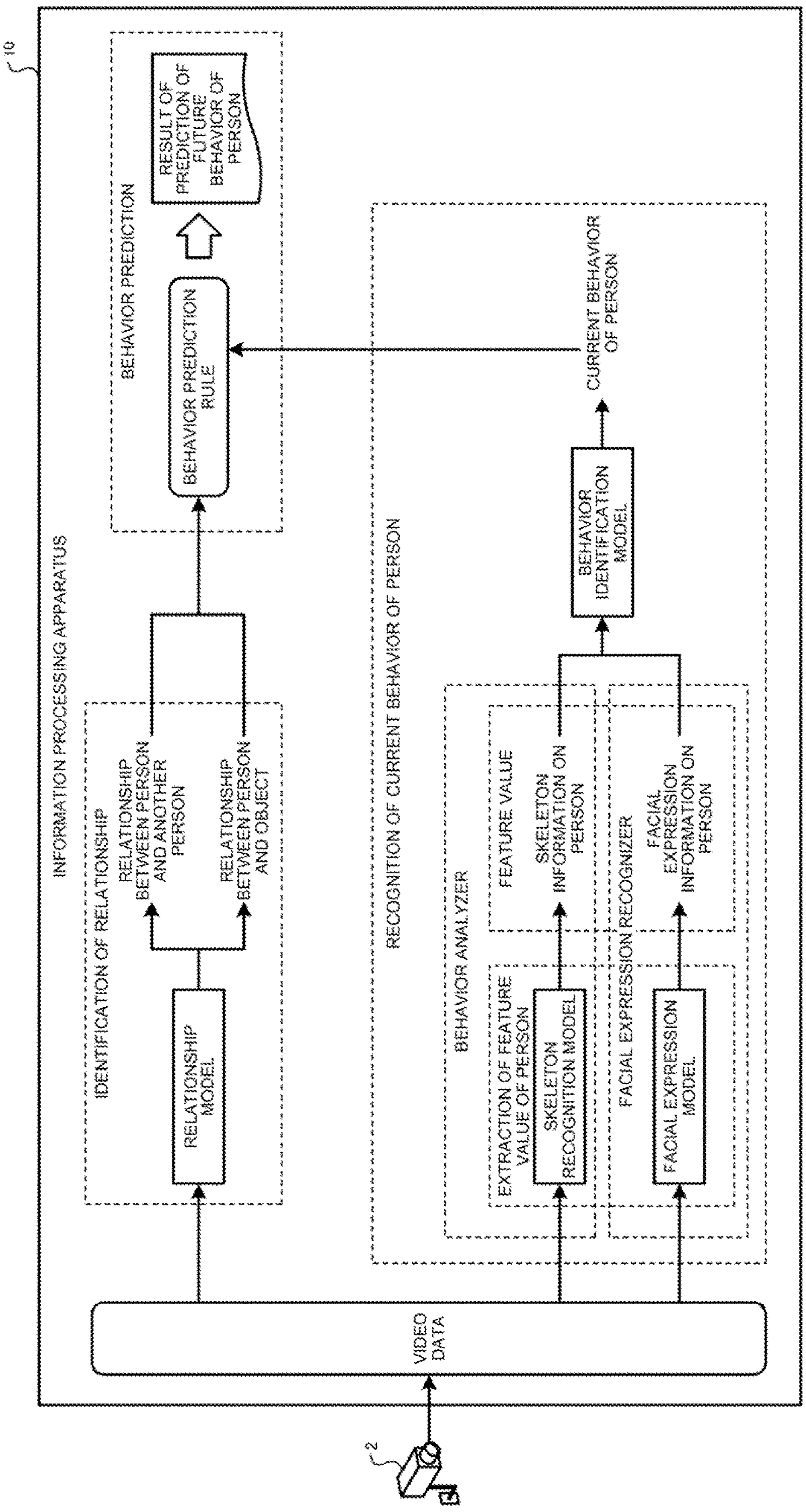
FIG. 2 is a diagram for explaining an information processing apparatus that implements behavior prediction according to the first embodiment.

FIG. 2 is a diagram for explaining the information processing apparatus 10 that implements the behavior prediction according to the first embodiment. As illustrated in FIG. 2, the information processing apparatus 10 identifies a relationship and recognizes a behavior of a person with respect to video data, and predicts a behavior of the person by using the identified relationship and the recognized behavior.

Specifically, the information processing apparatus 10 acquires video data that includes target objects including a person and an object. Then, the information processing apparatus 10 identifies a relationship between the target objects in the video data by using a relationship model for identifying the relationship between the target objects in the video data. Further, the information processing apparatus 10 identifies a current behavior of the person in the video data by using a feature value of the person included in the video data. Thereafter, the information processing apparatus 10 compares the identified current behavior of the person and the identified relationship with a behavior prediction rule that is set in advance, and predicts a future behavior of the person, such as a sign of shoplifting, or a state of the person, such as Alzheimer.

For example, as illustrated in FIG. 2, the information processing apparatus 10 inputs the video data to the relationship model, and identifies a relationship between a person and another person in the video data or a relationship between a person and an object (material body) in the video data.

Further, the information processing apparatus 10 recognizes a current behavior of the person by using a behavior analyzer and a facial expression recognizer. Specifically, the behavior analyzer inputs the video data to a trained skeleton recognition model, and acquires skeleton information that is one example of a feature value on the person. The facial expression recognizer inputs the video data to a trained facial expression recognition model, and acquires facial expression information that is one example of the feature value on the person. Furthermore, the information processing apparatus 10 refers to a behavior identification rule that is determined in advance, and recognizes a current behavior of the person corresponding to a combination of the identified skeleton information and the identified facial expression information on the person.

Thereafter, the information processing apparatus 10 refers to a behavior prediction rule that is one example of a rule in which a future behavior of a person is associated with each of combinations of human behaviors and relationships, and predicts a future behavior of the person corresponding to a combination of a relationship between a person and another person or a relationship between the person and an object and the current behavior of the person.

Here, as for the behavior that is predicted by the information processing apparatus 10, it is possible to perform various predictions from a short-term prediction to a long-term prediction. FIG. 3 is a diagram for explaining specific examples of the behavior prediction. As illustrated in FIG. 3, the behavior prediction that is performed by the information processing apparatus includes not only a "behavior", such as a purchase behavior and shoplifting, that can be determined by appearance of a person, but also an "emotion" and a "state", such as a disease, that is not easily determined by appearance of the person and that is affected by an internal state of the person.

Specifically, the information processing apparatus 10 predicts, as a super short-term prediction for next few seconds or next few minutes, an occurrence or a need of "human support by a robot", "online communication support", or the like. The information processing apparatus 10 predicts, as a short-term prediction for next few hours, an unexpected event or an event that occurs with a small amount of movement from a place in which a current behavior is performed, such as a "purchase behavior in a store", a "crime including shoplifting or stalking", or a "suicide". The information processing apparatus 10 predicts, as a medium-term prediction for next few days, an occurrence of a planned crime, such as a "police box attack" or "domestic violence". The information processing apparatus 10 predicts, as a long-term prediction for next few months, a potential event (state), such as "improvement in grade of study or sales" or a "prediction of disease including Alzheimer", which is not recognizable by appearance.

In this manner, the information processing apparatus 10 is able to detect a situation in which a countermeasure is needed in advance from the video data, so that it is possible to provide a service that aims at achieving a safe and secure society.

Functional Configuration

Figure 4:
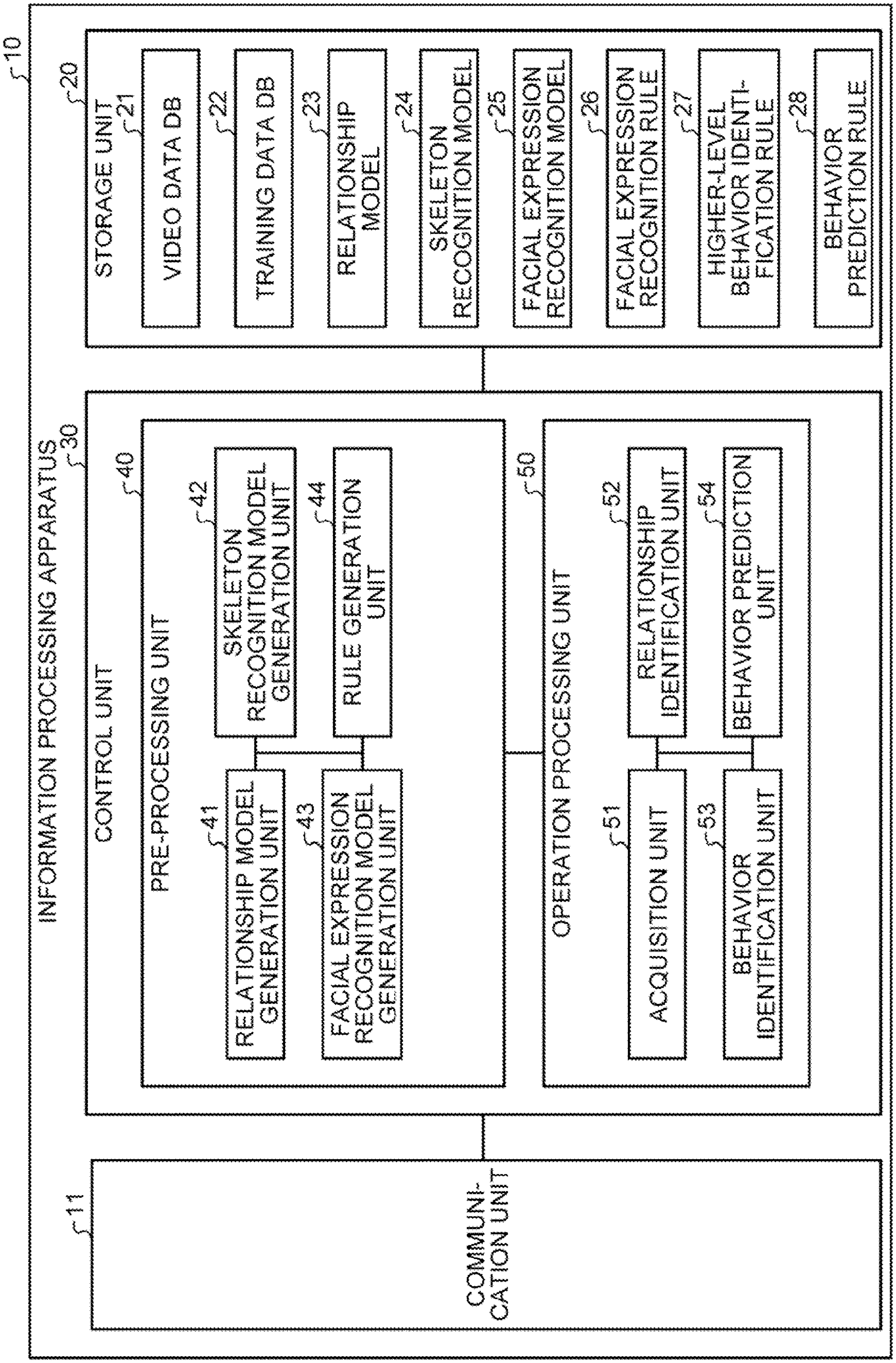
FIG. 4 is a functional block diagram illustrating a functional configuration of the information processing apparatus according to the first embodiment.

FIG. 4 is a functional block diagram illustrating a functional configuration of the information processing apparatus 10 according to the first embodiment. As illustrated in FIG.

4, the information processing apparatus 10 includes a communication unit 11, a storage unit 20, and a control unit 30.

The communication unit 11 is a processing unit that controls communication with a different apparatus, and is implemented by, for example, a communication interface or the like. For example, the communication unit 11 receives video data or the like from each of the cameras 2, and outputs a processing result obtained by the information processing apparatus 10 or the like to an apparatus or the like that is designated in advance.

The storage unit 20 is a processing unit that stores therein various kinds of data, a program executed by the control unit 30, and the like, and is implemented by, for example, a memory, a hard disk, or the like. The storage unit 20 stores therein a video data database (DB) 21, a training data DB 22, a relationship model 23, a skeleton recognition model 24, a facial expression recognition model 25, a facial expression recognition rule 26, a higher-level behavior identification rule 27, and a behavior prediction rule 28.

The video data DB 21 is a database for storing video data that is captured by each of the cameras 2 that are installed in the store 1. For example, the video data DB 21 stores therein video data for each of the cameras 2 or for each period of image capturing time.

The training data DB 22 is a database for storing graph data and various kinds of training data used to generate various machine learning models, such as the skeleton recognition model 24 and the facial expression recognition model 25. The training data stored herein includes supervised training data to which correct answer information is added and unsupervised training data to which correct answer information is not added.

The relationship model 23 is one example of a machine learning model for identifying a relationship between target objects included in video data. Specifically, the relationship model 23 is a model for Human Object Interaction Detection (HOID) that is generated by machine learning and that is used to identify a relationship between a person and another person or a relationship between a person and an object (material body).

For example, when the relationship between a person and another person is to be identified, an HOID model, which identifies and outputs, in accordance with input of a frame in the video data, a first class indicating a first person, first area information indicating an area in which the first person appears, a second class indicating a second person, second area information indicating an area in which the second person appears, and a relationship between the first class and the second class, is used as the relationship model 23.

Furthermore, when the relationship between a person and an object is to be identified, an HOID model, which identifies and outputs the first class indicating a person, the first area information indicating an area in which the person appears, the second class indicating an object, the second area information indicating an area in which the object appears, and a relationship between the first class and the second class, is used as the relationship model 23.

Meanwhile, the relationship described herein includes, as one example, not only a simple relationship, such as "hold", but also a complex relationship, such as "hold product A in right hand", "stalking a person walking ahead", or "looking over his/her shoulder". Meanwhile, as the relationship model 23, it may be possible to separately use the two HOID models as described above or use a single HOID model that is generated to identify both of the relationship between a person and another person and the relationship between a person and an object. Furthermore, while the relationship model 23 is generated by the control unit 30 to be described later, it may be possible to use a model that is generated in advance.

The skeleton recognition model 24 is one example of a machine learning model for generating skeleton information that is one example of a feature value of a person. Specifically, the skeleton recognition model 24 outputs two-dimensional skeleton information, in accordance with input of image data. For example, the skeleton recognition model 24 is one example of a deep learning device that estimates a two-dimensional joint position (skeleton coordinate), such as a head, a wrist, a waist, or an ankle, with respect to two-dimensional image data of a person, and recognizes a basic action and a rule that is defined by a user.

With use of the skeleton recognition model 24, it is possible to recognize a basic action of a person, and acquire a position of an ankle, a face orientation, and a body orientation. Examples of the basic action include walk, run, and stop. The rule that is defined by the user includes a change of the skeleton information corresponding to each of behaviors that are performed before taking a product in hand. While the skeleton recognition model 24 is generated by the control unit 30 to be described later, it may be possible to use data that is generated in advance.

The facial expression recognition model 25 is one example of a machine learning model for generating facial expression information related to a facial expression that is one example of a feature value of a person. Specifically, the facial expression recognition model 25 is a machine learning model that estimates an action unit (AU) that is a method of disassembling and quantifying a facial expression on the basis of parts of a face and facial muscles. The facial expression recognition model 25 outputs, in accordance with input of image data, a facial expression recognition result, such as "AU1: 2, AU2: 5, AU4: 1, . . . ", that represents occurrence strength (for example: five-grade evaluation) of each of AUs from AU1 to AU28 that are set to identify a facial expression. While the facial expression recognition model 25 is generated by the control unit 30 to be described later, it may be possible to use data that is generated in advance.

The facial expression recognition rule 26 is a rule for recognizing a facial expression by using an output result from the facial expression recognition model 25. FIG. 5 is a diagram illustrating an example of the facial expression recognition rule 26. As illustrated in FIG. 5, the facial expression recognition rule 26 stores therein a "facial expression" and an "estimation result" in an associated manner. The "facial expression" is a facial expression of a recognition target, and the "estimation result" is strength of each of the AUs from the AU1 to the AU28 corresponding to each of facial expressions. In the example illustrated in FIG. 5, it is indicated that if "AU1 has strength of 2, AU2 has strength of 5, AU3 has strength of 0, . . . ", a facial expression is recognized as a "smile". Meanwhile, the facial expression recognition rule 26 is data that is registered in advance by an administrator or the like.

The higher-level behavior identification rule 27 is a rule for identifying a current behavior of a person. FIG. 6 is a diagram illustrating an example of the higher-level behavior identification rule 27. As illustrated in FIG. 6, the higher-level behavior identification rule 27 is a rule in which a current behavior and a change of elemental behaviors, which are performed to identify the current behavior, are associated.

In the example illustrated in FIG. 6, it is defined that a current behavior XX is identified if an elemental behavior B, an elemental behavior A, an elemental behavior P, and an elemental behavior J are performed in this order. For example, the current behavior XX is a "behavior with interest in product A", the elemental behavior B is "stop", the elemental behavior A is "look at product A", the elemental behavior P is "take product A in hand", and the elemental behavior J is "put product A in basket", or the like.

Furthermore, each of the elemental behaviors is associated with a basic action and a facial expression. For example, as for the elemental behavior B, the basic action is defined such that "as a time series pattern in a period from a time t1 to a time t3, a basic action of a whole body changes to basic actions 02, 03, and 03, a basic action of a right arm changes to basic actions 27, 25, and 25, and a basic action of a face changes to basic actions 48, 48, and 48", and the facial expression is defined such that "as a time series pattern in the period from the time t1 to the time t3, a facial expression H continues".

Meanwhile, the representation, such as the basic action 02, that is a representation using an identifier for identifying each of the basic actions is used for convenience of explanation, and corresponds to, for example, stop, arm raising, squat, or the like. Similarly, the representation, such as the facial expression H, that is a representation using an identifier for identifying each of the facial expressions is used for convenience of explanation, and corresponds to, for example, a smile, an angry face, or the like. While the higher-level behavior identification rule 27 is generated by the control unit 30 to be described later, it may be possible to use data that is generated in advance.

The behavior prediction rule 28 is one example of a rule in which a future behavior of a person is associated with each of combinations of human behaviors and relationships. FIG. 7 is a diagram illustrating an example of the behavior prediction rule 28. As illustrated in FIG. 7, the behavior prediction rule 28 defines contents of future behavior prediction for each of combinations of current behaviors and relationships.

In the example illustrated in FIG. 7, it is indicated that "purchase of product A ten minutes later than now" is predicted if the current behavior is "hold product A in hand" and the relationship is "hold". Further, it is indicated that "move to food section" is predicted if the current behavior is "hold product A in hand" and the relationship is "put product in basket". Furthermore, it is indicated that "attack to person" is predicted if the current behavior is "following" and the relationship is "stalking". Meanwhile, the behavior prediction rule 28 is generated by an administrator or the like by using a past history or the like.

Referring back to FIG. 4, the control unit 30 is a processing unit that controls the entire information processing apparatus 10, and is implemented by, for example, a processor or the like. The control unit 30 includes a pre-processing unit 40 and an operation processing unit 50. Meanwhile, the pre-processing unit 40 and the operation processing unit 50 are implemented by an electronic circuit included in the processor, a process performed by the processor, or the like.

Pre-Processing Unit 40

The pre-processing unit 40 is a processing unit that generates each of the models, the rules, and the like by using the training data stored in the storage unit 20, before operation of the behavior prediction. The pre-processing unit 40 includes a relationship model generation unit 41, a skeleton recognition model generation unit 42, a facial expression recognition model generation unit 43, and a rule generation unit 44.

Generation of Relationship Model

The relationship model generation unit 41 is a processing unit that generates the relationship model 23 by using the training data stored in the training data DB 22. Here, as one example, an example will be described in which an HOID model using a neural network or the like is generated as the relationship model 23. Meanwhile, as only one example, generation of an HOID model for identifying a relationship between a person and an object will be described, but an HOID model for identifying a relationship between a person and another person may be generated in the same manner.

Figure 8:
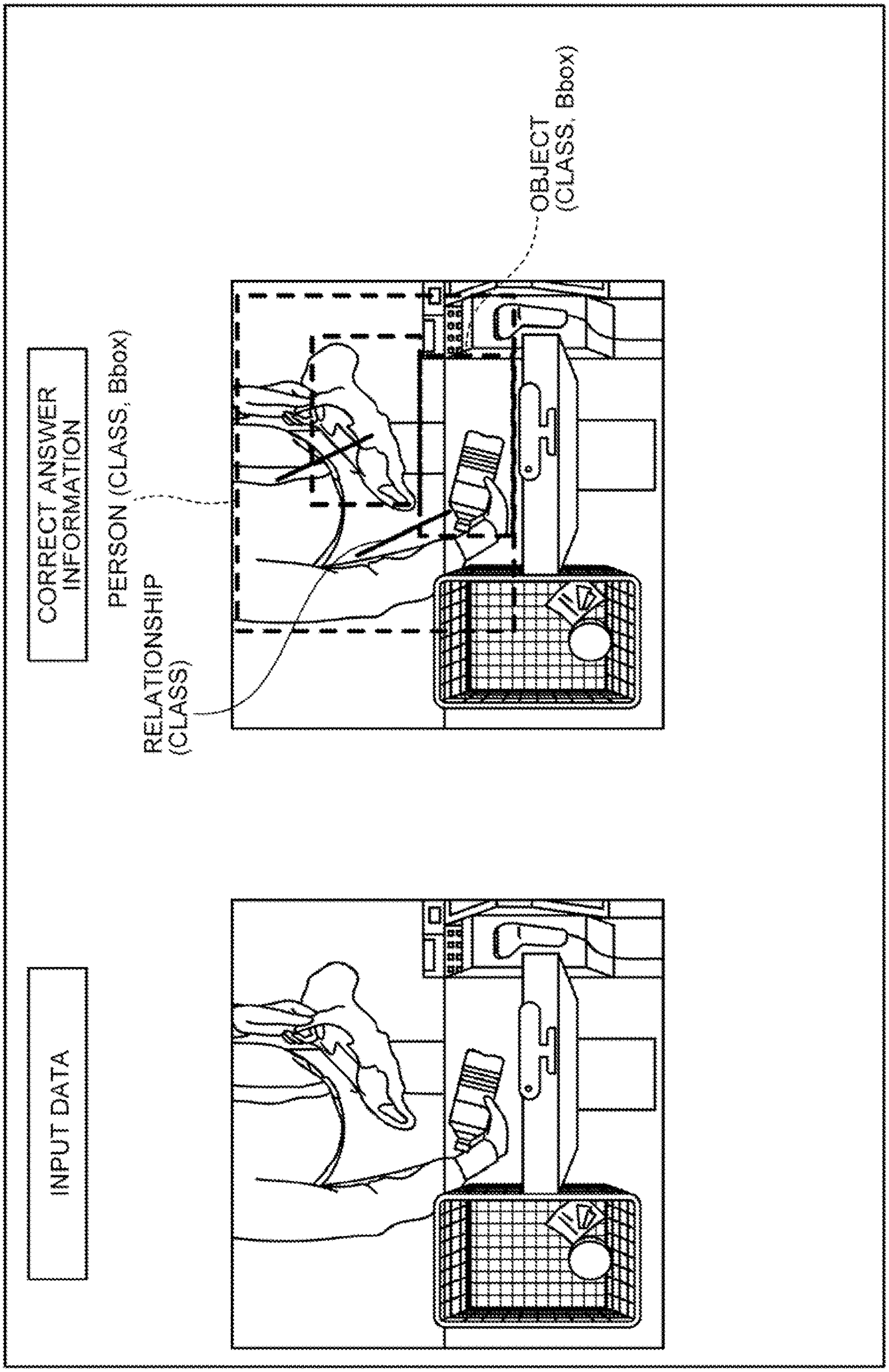
FIG. 8 is a diagram for explaining training data.

First, training data that is used for machine learning for the HOID model will be described. FIG. 8 is a diagram for explaining the training data. As illustrated in FIG. 8, each piece of training data includes image data that is used as input data, and correct answer information that is set for the image data.

In the correct answer information, a class (first class) of a person as a detection target, a class (second class) of an object to be purchased or operated by the person, a relationship class indicating interaction between the person and the object, and a bounding box (Bbox; area information on the object) indicating an area of each of the classes are set. Specifically, information on the object that is held by the person is set as the correct answer information. Meanwhile, the interaction between the person and the object is one example of the relationship between the person and the object. Further, for use for identification of the relationship between a person and another person, a class indicating another person is used as the second class, area information on another person is used as the area information on the second class, and the relationship between the person and another person is used as the relationship class.

Figure 9:
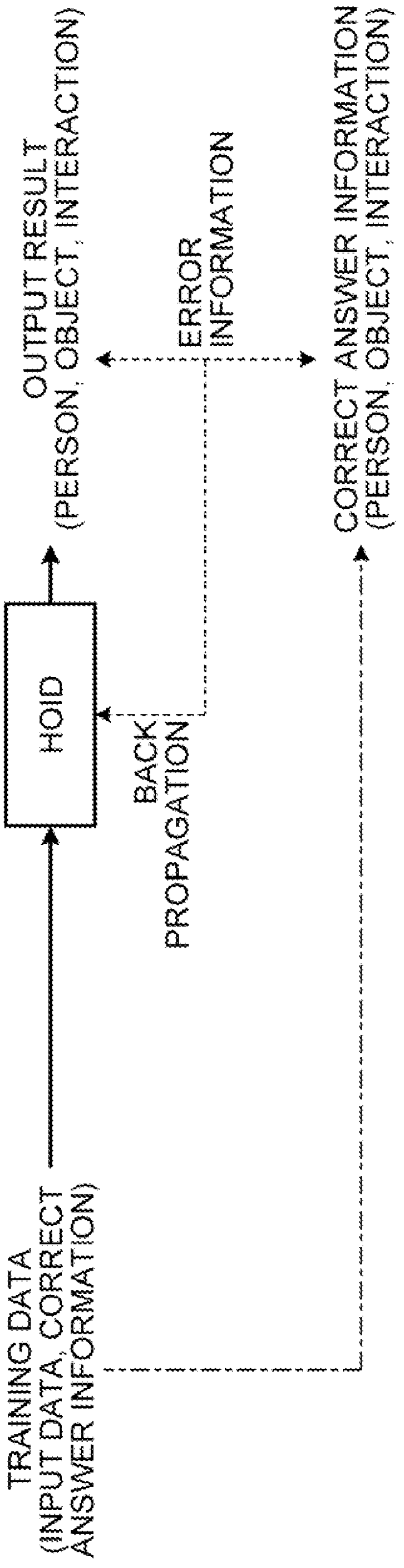
FIG. 9 is a diagram for explaining machine learning for a relationship model.

Machine learning for the HOID model using the training data will be described below. FIG. 9 is a diagram for explaining machine learning for the relationship model 23. As illustrated in FIG. 9, the relationship model generation unit 41 inputs the training data to the HOID model and acquires an output result from the HOID model. The output result includes a class of a person, a class of an object, a relationship (interaction) between the person and the object, and the like, which are detected by the HOID model. Further, the relationship model generation unit 41 calculates error information between the correct answer information on the training data and the output result of the HOID model, and performs machine learning for the HOID model by back propagation to reduce an error.

Generation of skeleton recognition model 24

The skeleton recognition model generation unit 42 is a processing unit that generates the skeleton recognition model 24 by using training data. Specifically, the skeleton recognition model generation unit 42 generates the skeleton recognition model 24 by supervised learning using training data to which correct answer information (label) is added.

Figure 10:
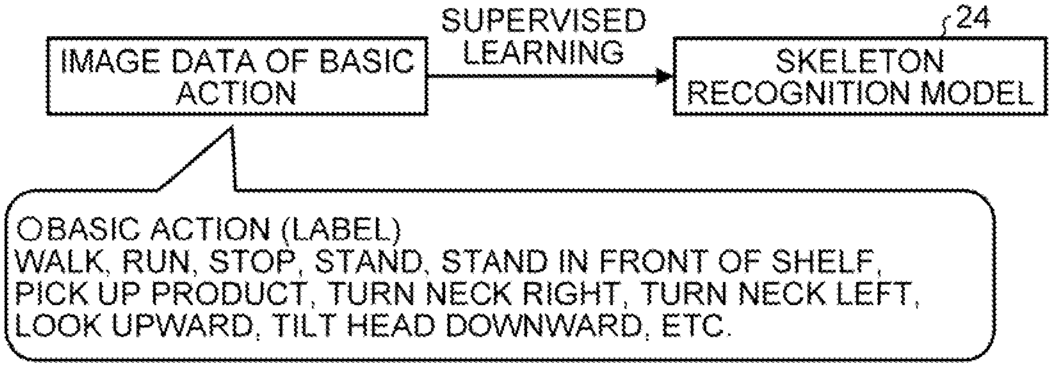
FIG. 10 is a diagram for explaining generation of a skeleton recognition model.

FIG. 10 is a diagram for explaining generation of the skeleton recognition model 24. As illustrated in FIG. 10, the skeleton recognition model generation unit 42 inputs image data of a basic action, to which a label of a basic action is added, to the skeleton recognition model 24, and performs machine learning for the skeleton recognition model 24 such that an error between an output result of the skeleton recognition model 24 and the label is reduced. For example, the skeleton recognition model 24 is a neural network. The skeleton recognition model generation unit 42 performs machine learning for the skeleton recognition model 24, and changes a parameter of the neural network. The skeleton recognition model 24 inputs an explanatory variable that is image data (for example, image data of a person who is performing the basic action) to the neural network. Then, the skeleton recognition model 24 generates a machine learning model in which a parameter of the neural network is changed such that an error between an output result that is output by the neural network and the correct answer data that is the label of the basic action is reduced.

Meanwhile, it is possible to use, as the training data, each piece of image data to which "walk", "run", "stop", "stand", "stand in front of shelf", "pick up product", "turn neck right", "turn neck left", "look upward", "tilt head downward", or the like is added as the "label". Meanwhile, generation of the skeleton recognition model 24 is only one example, and it may be possible to use a different method. Further, behavior recognition as disclosed in Japanese Laid-open Patent Publication No. 2020-71665 and Japanese Laid-open Patent Publication No. 2020-77343 may be used as the skeleton recognition model 24.

Generation of Facial Expression Recognition Model 25

The facial expression recognition model generation unit 43 is a processing unit that generates the facial expression recognition model 25 by using training data. Specifically, the facial expression recognition model generation unit 43 generates the facial expression recognition model 25 by supervised learning using training data to which correct answer information (label) is added.

Figure 11:
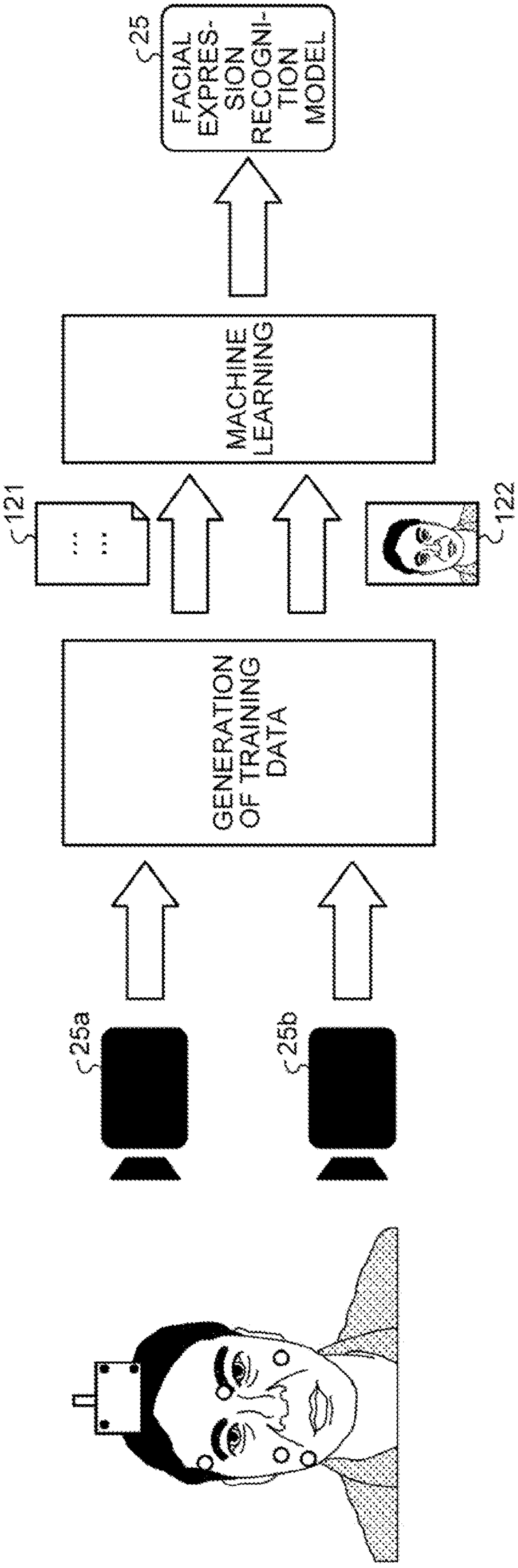
FIG. 11 is a diagram for explaining an example of generation of a facial expression recognition model.
Figure 12:
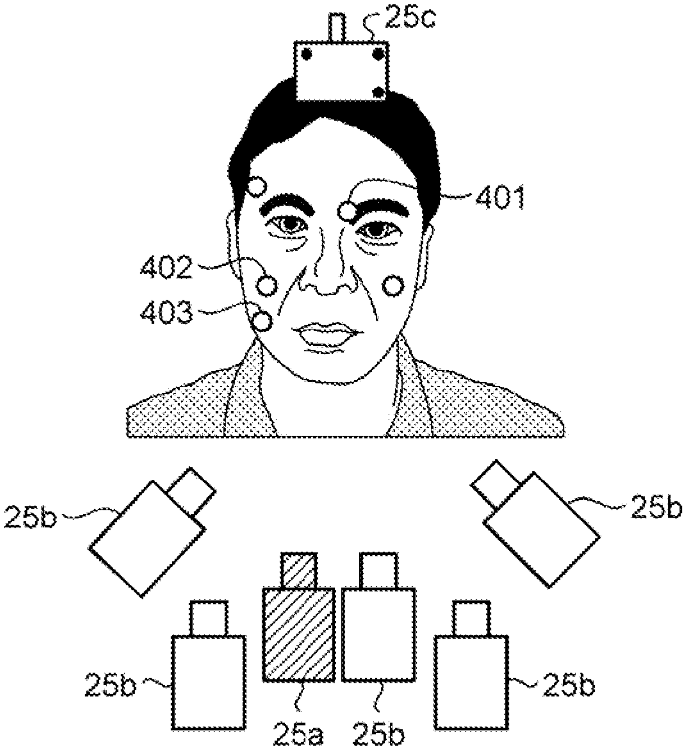
FIG. 12 is a diagram illustrating an example of arrangement of cameras.
Figure 13:
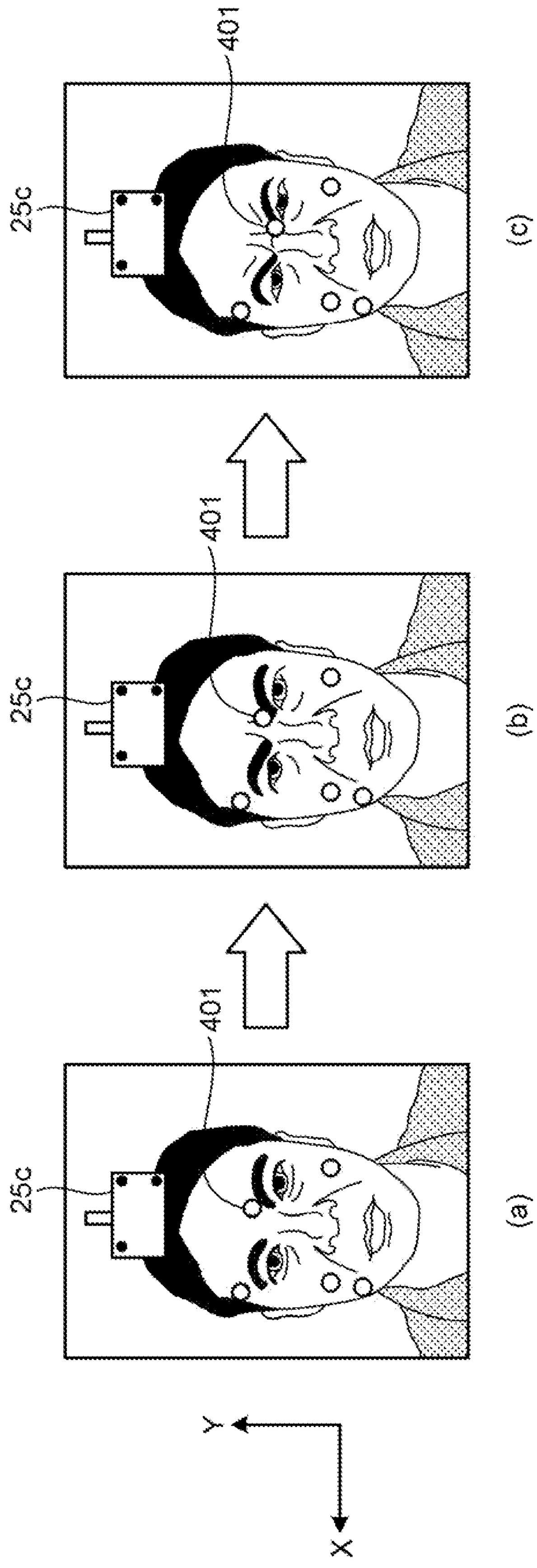
FIG. 13 is a diagram for explaining movement of markers.

Generation of the facial expression recognition model 25 will be described below with reference to FIG. 11 to FIG. 13. FIG. 11 is a diagram for explaining an example of generation of the facial expression recognition model 25. As illustrated in FIG. 11, the facial expression recognition model generation unit 43 generates training data and performs machine learning with respect to image data that is captured by each of a red-green-blue (RGB) camera 25*a* and an infrared (IR) camera 25*b*.

As illustrated in FIG. 11, first, the RGB camera 25*a* and the IR camera 25*b* are oriented toward a face of a person to which markers are added. For example, the RGB camera 25*a* is a general digital camera that receives visible light and generates an image. Further, for example, the IR camera 25*b* senses infrared. Furthermore, the markers are, for example, IR reflection (recursive reflection) markers. The IR camera 25*b* is able to perform motion capture by using IR reflection by the markers. Moreover, in the following description, a person as an image capturing target will be referred to as a subject.

In a training data generation process, the facial expression recognition model generation unit 43 acquires image data that is captured by the RGB camera 25*a* and a result of the motion capture that is performed by the IR camera 25*b*. Further, the facial expression recognition model generation unit 43 generates AU occurrence strength 121 and image data 122 by removing the markers from the captured image data by image processing. For example, the occurrence strength 121 may be data which represents the occurrence strength of each of the AUs by five-grade evaluation using A to E, and to which annotation such as "AU1: 2, AU2: 5, AU4: 1, . . . " is added.

In a machine learning process, the facial expression recognition model generation unit 43 performs machine learning by using the image data 122 and the AU occurrence strength 121 that are output through the training data generation process, and generates the facial expression recognition model 25 for estimating the AU occurrence strength from the image data. The facial expression recognition model generation unit 43 is able to use the AU occurrence strength as a label.

Arrangement of the cameras will be described below with reference to FIG. 12. FIG. 12 is a diagram illustrating an example of arrangement of the cameras. As illustrated in FIG. 12, the plurality of IR cameras 25*b* may constitute a marker tracking system. In this case, the marker tracking system is able to detect positions of the IR reflection markers by stereo imaging. Further, it is assumed that relative positional relationships among the plurality of IR cameras 25*b* are corrected in advance by camera calibration.

Furthermore, a plurality of markers are attached so as to cover the AU1 to the AU28 on a face of the subject to be captured. Positions of the markers are changed in accordance with a change of a facial expression of the subject. For example, a marker 401 is arranged in the vicinity of an inner corner of an eyebrow. A marker 402 and a marker 403 are arranged in the vicinity of a nasolabial fold. The markers may be arranged on a skin corresponding to one or more of the AUs and motion of facial muscles. Moreover, the markers may be arranged so as to avoid a skin on which a texture is largely changed due to wrinkle or the like.

Furthermore, the subject wears an instrument 25*c* to which a reference point marker is attached, on the outside of the face contour. It is assumed that a position of the reference point marker attached to the instrument 25*c* does not change even if the facial expression of the subject changes. Therefore, the facial expression recognition model generation unit 43 is able to detect a change in the positions of the markers attached to the face, in accordance with a change in a relative position with respect to the reference point marker. Moreover, by providing three or more reference markers, the facial expression recognition model generation unit 43 is able to identify the positions of the markers in a three-dimensional space.

The instrument 25*c* is, for example, a head band. Further, the instrument 25*c* may be a virtual reality (VR) head set, a mask made of a hard material, or the like. In this case, the facial expression recognition model generation unit 43 is able to use a rigid surface of the instrument 25*c* as the reference point marker.

Meanwhile, when the IR camera 25*b* and the RGB camera 25*a* capture images, the subject continuously changes the facial expression. Therefore, it is possible to acquire, as an image, how the facial expression changes in chronological order. Furthermore, the RGB camera 25*a* may capture moving images. The moving image can be regarded as a plurality of still images that are arranged in chronological order. Moreover, the subject may freely change the facial expression or may change the facial expression according to a scenario that is determined in advance.

Meanwhile, it is possible to determine the AU occurrence strength by movement amounts of the markers. Specifically, the facial expression recognition model generation unit 43 is able to determine the occurrence strength on the basis of the movement amounts of the markers that are calculated based on distances between a certain position that is set in advance as a determination criterion and the positions of the markers.

The movement of the markers will be described below with reference to FIG. 13. FIG. 13 is a diagram for explaining movement of the markers. FIGS. 13(*a*), (*b*), and (*c*) are images that are captured by the RGB camera 25*a*. Further, it is assumed that the images in (a), (b), and (c) are captured in this order. For example, (a) represents an image that is obtained when the subject has an expressionless face. The facial expression recognition model generation unit 43 is able to regard the positions of the markers in the image (a) as reference positions at which the movement amounts are zero. As illustrated in FIG. 13, the subject has a facial expression in which the eyebrows are knitted. In this case, the position of the marker 401 moves downward along with a change in the facial expression. At this time, a distance between the position of the marker 401 and the reference marker attached to the instrument 25*c* is increased.

In this manner, the facial expression recognition model generation unit 43 identifies image data in which a certain facial expression of the subject appears, and strength of each of the markers at the time of the facial expression, and generates training data with an explanatory variable of "image data" and an objective variable of "strength of each of the markers". Further, the facial expression recognition model generation unit 43 generates the facial expression recognition model 25 through supervised learning using the generated training data. For example, the facial expression recognition model 25 is a neural network. The facial expression recognition model generation unit 43 performs machine learning for the facial expression recognition model 25, and changes a parameter of the neural network. The facial expression recognition model 25 inputs the explanatory variable to the neural network. Then, the facial expression recognition model 25 generates a machine learning model in which a parameter of the neural network is changed such that an error between an output result that is output by the neural network and the correct answer data that is the objective variable is reduced.

Meanwhile, generation of the facial expression recognition model 25 is only one example, and it may be possible to use a different method. Further, behavior recognition as disclosed in Japanese Laid-open Patent Publication No. 2021-111114 may be used as the facial expression recognition model 25.

Generation of Higher-Level Behavior Identification Rule 27

Referring back to FIG. 4, the rule generation unit 44 is a processing unit that generates the higher-level behavior identification rule 27 by using a past history or the like. Specifically, the rule generation unit 44 identifies, from various kinds of past video data, changes of actions and facial expressions before a person performs a certain behavior, and generates the higher-level behavior identification rule 27.

Figure 14:
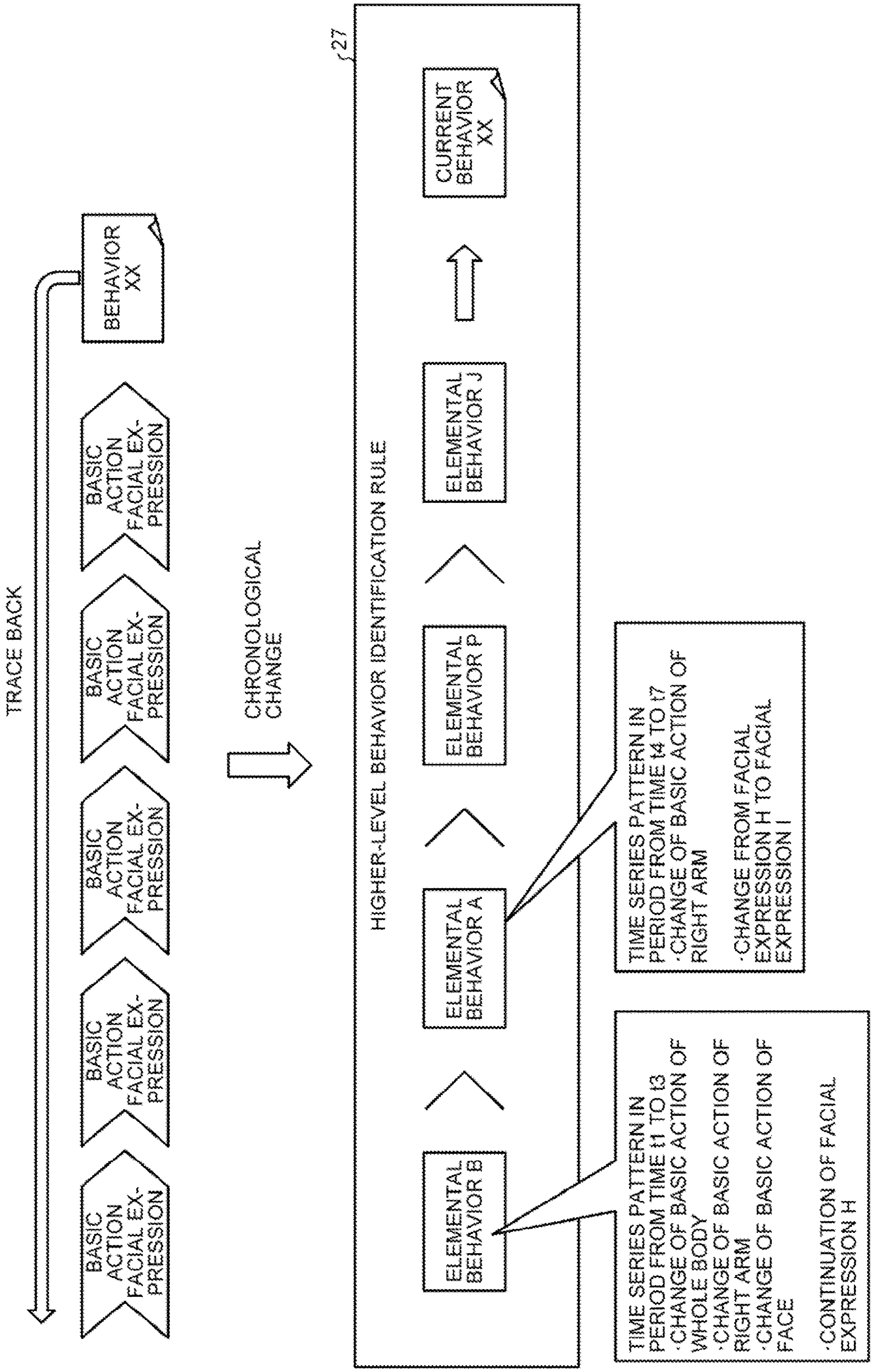
FIG. 14 is a diagram for explaining an example of generation of the higher-level behavior identification rule.

FIG. 14 is a diagram for explaining an example of generation of the higher-level behavior identification rule. As illustrated in FIG. 14, the rule generation unit 44 extracts a plurality of pieces of past image data, which are acquired before a certain piece of image data in which a certain behavior XX is performed, by tracing back the data for a predetermined time from the certain image data. Then, the rule generation unit 44 detects basic actions and facial expressions by using a trained model, an image analysis, or the like with respect to each piece of the past image data that are acquired by trace back.

Thereafter, the rule generation unit 44 identifies changes of the elemental behaviors (changes of the basic actions and changes of the facial expressions) that are detected before the behavior XX. For example, the rule generation unit 44 identifies, as the elemental behavior B, "a change of the basic action of the whole body, a change of the basic action of the right arm, and a change of the basic action of the face in the period from the time t1 to the time t3" and "continuation of the facial expression H in the period from the time t1 to the time t3". Furthermore, the rule generation unit 44 identifies, as the elemental behavior A, "a change of the basic action of the right arm and a change from the facial expression H to the facial expression I in a period from a time t4 to a time t7".

In this manner, the rule generation unit 44 identifies, as the change of the elemental behaviors before the behavior XX, the sequence of the elemental behavior B, the elemental behavior A, the elemental behavior P, and the elemental behavior J in this order. Further, the rule generation unit 44 generates the higher-level behavior identification rule 27 in which the "behavior XX" and "changes to the elemental behavior B, the elemental behavior A, the elemental behavior P, and the elemental behavior J" are associated, and stores the generated higher-level behavior identification rule 27 in the storage unit 20.

Meanwhile, generation of the higher-level behavior identification rule 27 is only one example, and it may be possible to use a different method or it may be possible to generate the higher-level behavior identification rule 27 manually by an administrator or the like.

Operation Processing Unit 50

Referring back to FIG. 4, the operation processing unit 50 is a processing unit that includes an acquisition unit 51, a relationship identification unit 52, a behavior identification unit 53, and a behavior prediction unit 54, and performs a behavior prediction process of predicting a future behavior of a person who appears in the video data, by using each of the models and each of the rules that are prepared by the pre-processing unit 40 in advance.

The acquisition unit 51 is a processing unit that acquires video data from each of the cameras 2 and stores the video data in the video data DB 21. For example, the acquisition unit 51 may acquire the video data from each of the cameras 2 on an as-needed basis or in a periodic manner.

Identification of Relationship

The relationship identification unit 52 is a processing unit that performs a relationship identification process of identifying a relationship between a person and another person who appear in the video data or a relationship between a person and an object that appear in the video data, by using the relationship model 23. Specifically, the relationship identification unit 52 inputs each of frames included in the video data to the relationship model 23 for each of the frames, and identifies a relationship in accordance with an output result of the relationship model 23. Then, the relationship identification unit 52 outputs the identified relationship to the behavior prediction unit 54.

Figure 15:
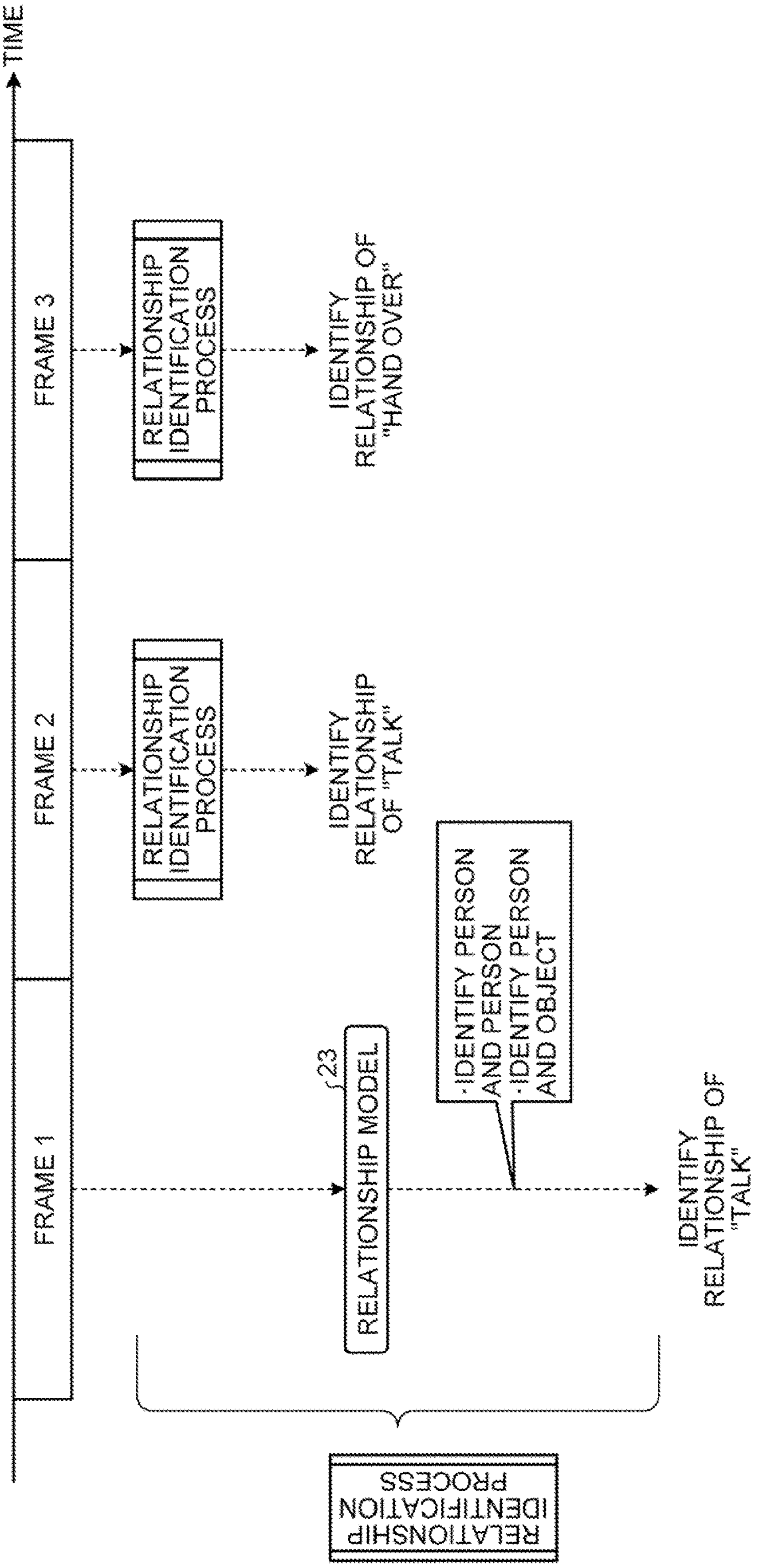
FIG. 15 is a diagram for explaining identification of a relationship.

FIG. 15 is a diagram for explaining identification of a relationship. As illustrated in FIG. 15, the relationship identification unit 52 inputs a frame 1 to the relationship model 23 that has been subjected to machine learning, and identifies a class of a first person, a class of a second person, and a relationship between the persons. As another example, the relationship identification unit 52 inputs the frame to the relationship model 23 that has been subjected to machine learning, and identifies a class of a person, a class of an object, and a relationship between the person and the object. In this manner, the relationship identification unit 52 identifies a relationship between persons or a relationship between a person and an object for each of the frames by using the relationship model 23.

Figure 16:
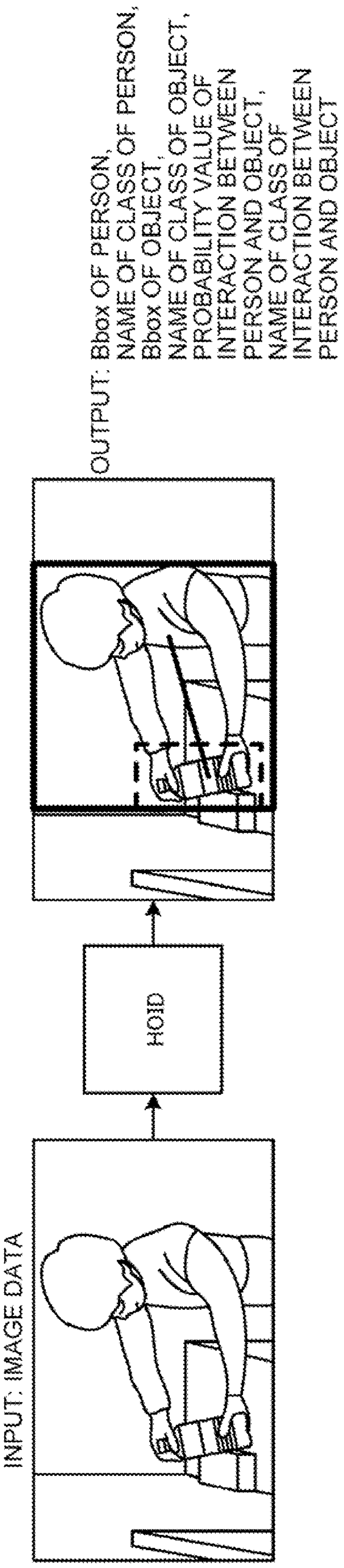
FIG. 16 is a diagram for explaining identification of a relationship using HOID.

FIG. 16 is a diagram for explaining identification of a relationship using HOID. As illustrated in FIG. 16, the relationship identification unit 52 inputs each of the frames (image data) included in the video data to the HOID (the relationship model 23), and acquires an output result of the HOID. Specifically, the relationship identification unit 52 acquires a Bbox of a person, a name of a class of the person, a Bbox of an object, a name of a class of the object, a probability value of interaction between the person and the object, and a name of a class of the interaction between the person and the object.

As a result, for example, the relationship identification unit 52 identifies a "person (customer)" and a "person (store clerk)" as classes of persons, and identifies a relationship of "store clerk talks with customer" between the "person (customer)" and the "person (shop clerk)". The relationship identification unit 52 performs the relationship identification process as described above on each of the subsequent frames, such as a frame 2 and a frame 3, and identifies a relationship of "talk", a relationship of "hand over", or the like for each of the frames.

Meanwhile, as another example, the relationship identification unit 52 inputs the frame to the relationship model 23 that has been subjected to machine learning, and identifies a class of a person, a class of an object, and a relationship between the person and the object. For example, the relationship identification unit 52 identifies a "customer" as the class of the person, identifies a "product" as the class of the object, and identifies a relationship of "customer holds product" as the relationship between the "customer" and the "product".

Identification of Current Behavior

The behavior identification unit 53 is a processing unit that identifies a current behavior of a person from video data. Specifically, the behavior identification unit 53 acquires the skeleton information on each of parts of a person by using the skeleton recognition model 24 and identifies a facial expression of the person by using the facial expression recognition model 25, for each of the frames in the video data. Then, the behavior identification unit 53 identifies a behavior of the person by using the skeleton information on each of the parts of the person and the facial expression of the person that are identified for each of the frames, and outputs the identified behavior of the person to the behavior prediction unit 54.

Figure 17:
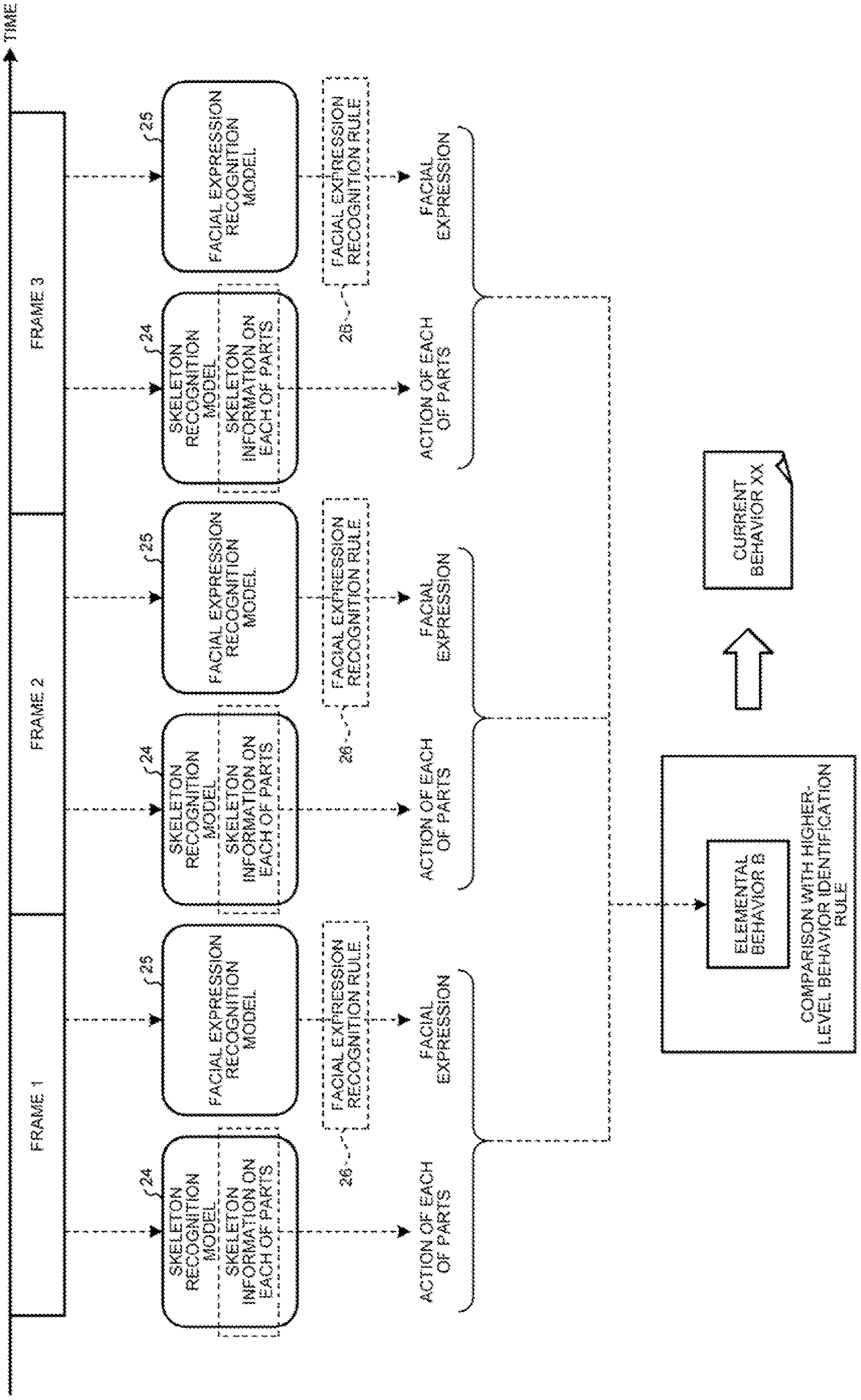
FIG. 17 is a diagram for explaining a specific example of identification of a current behavior of a person.

FIG. 17 is a diagram for explaining a specific example of identification of a current behavior of a person. As illustrated in FIG. 17, the behavior identification unit 53 inputs the frame 1 that is image data to the skeleton recognition model 24 and the facial expression recognition model 25. The skeleton recognition model 24 generates the skeleton information on each of the parts in accordance with input of the frame 1, and outputs an action of each of the parts in accordance with the skeleton information on each of the parts. For example, the behavior identification unit 53 is able to acquire action information on each of the parts, such as "face: facing front, arm: raise, leg: walk, . . . ", by using the skeleton recognition model 24. Further, the facial expression recognition model 25 outputs, as a facial expression recognition result, the occurrence strength, such as "AU1: 2, AU2: 5, AU4: 1, . . . ", of each of the AUs, i.e., the AU1 to the AU28, in accordance with input of the frame 1. Furthermore, the behavior identification unit 53 checks the facial expression recognition result with the facial expression recognition rule 26, and identifies a facial expression of "smile" or the like.

The behavior identification unit 53 performs the identification process as described above on each of the subsequent frames, such as the frame 2 and the frame 3, and identifies the action information on each of the parts of the person and the facial expression on the person who appears in the frame, for each of the frames.

Moreover, the behavior identification unit 53 performs the identification process as described above on each of the frames, and identifies a change of the action of each of the parts of the person and a change of the facial expression. Thereafter, the behavior identification unit 53 compares the change of the action of each of the parts of the person and the change of the facial expression with each of the elemental behaviors in the higher-level behavior identification rule 27, and identifies the elemental behavior B.

Furthermore, the behavior identification unit 53 repeats the identification of the elemental behavior from the video data, and identifies a change of the elemental behaviors. Then, the behavior identification unit 53 compares the change of the elemental behaviors and the higher-level behavior identification rule 27, and identifies the current behavior XX of the person who appears in the video data.

While the example has been described in the example illustrated in FIG. 17 in which both of the action of each of the parts and the facial expression are identified for each of the frames, embodiments are not limited to this example. For example, the facial expression of the person is affected by a change of an internal state of the person, and therefore, a facial expression that appears when a certain behavior is performed does not always coincide with a facial expression that represents the internal state at the time of the behavior. In other words, when the facial expression changes after a certain behavior is performed, it is often the case that the facial expressions are different before and after the certain behavior is performed. To cope with this, the behavior identification unit 53 is able to identify a facial expression by using a different frame from the frame that is used to identify the action of each of the parts.

Figure 18:
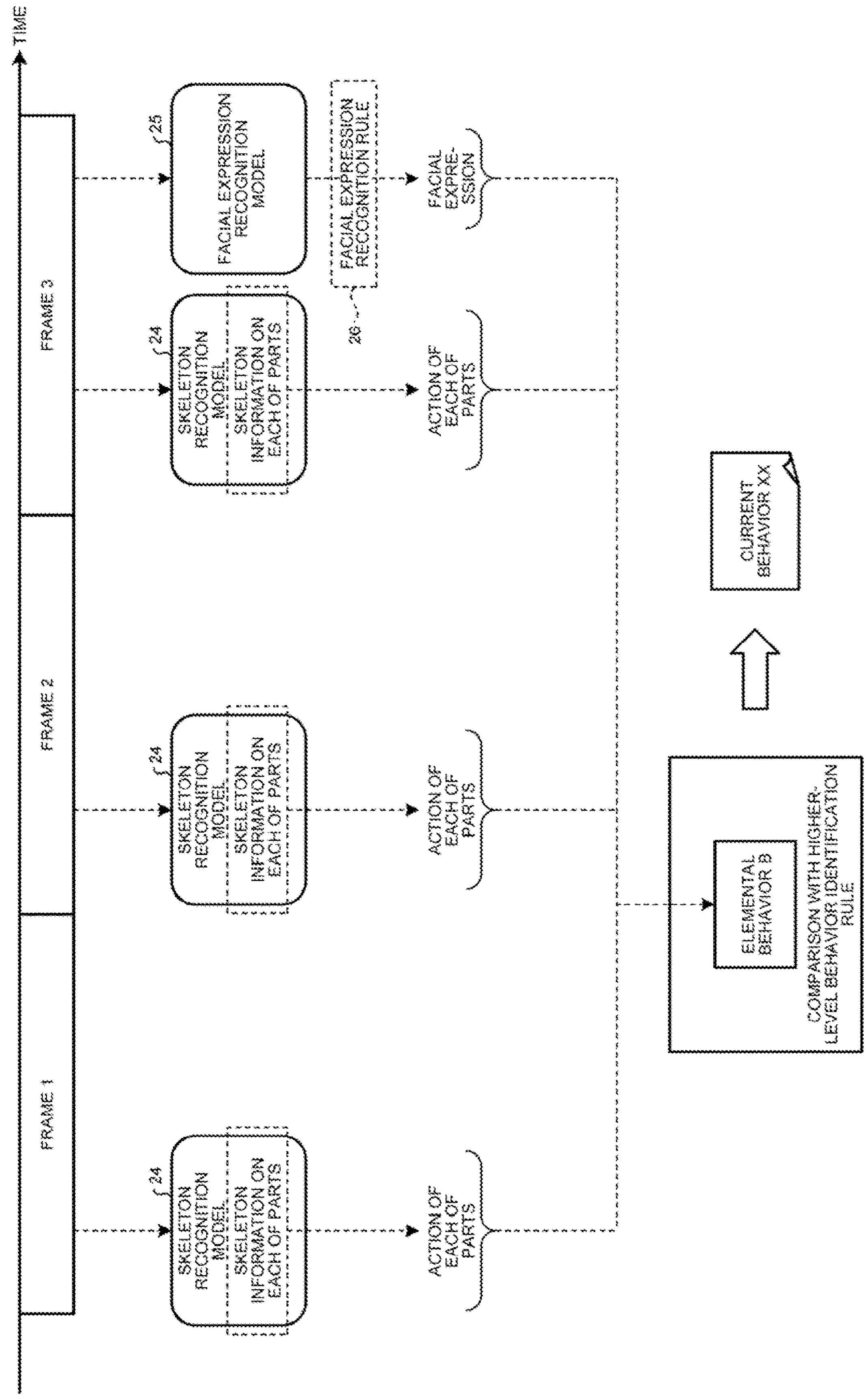
FIG. 18 is a diagram for explaining another example of identification of a current behavior of a person.

FIG. 18 is a diagram for explaining another example of identification of a current behavior of a person. In FIG. 18, an example will be described in which actions are identified for each of the frames by adopting the frame 1, the frame 2, and the frame 3 as a single processing unit, and facial expression recognition is performed in the latest frame (the frame 3 in this example). As illustrated in FIG. 18, similarly to FIG. 17, the behavior identification unit 53 performs skeleton recognition using the skeleton recognition model 24 on the frame 1, the frame 2, and the frame 3, and identifies the action of each of the parts for each of the frames. Further, the behavior identification unit 53 inputs the frame 3 to the facial expression recognition model 25 and identifies the facial expression of the person.

Thereafter, similarly to FIG. 17, the behavior identification unit 53 identifies the elemental behavior and identifies the current behavior. Meanwhile, the examples described above are mere examples, and therefore, the behavior identification unit 53 may identify the action of each of the parts for each of the frames and recognizes the facial expression by using the first frame. Further, the behavior identification unit 53 may identify the action for each of the frames and, with respect to the facial expression recognition, may identify facial expressions or a change of facial expressions that may be observed between the frames, by using the plurality of frames (the frame 1 to the frame 3 in FIG. 18).

Prediction of Future Behavior

The behavior prediction unit 54 is a processing unit that predicts a future behavior of a person by using the current behavior of the person and the relationship. Specifically, the behavior prediction unit 54 searches through the behavior prediction rule 28 by using the relationship that is identified by the relationship identification unit 52 and the current behavior of the person that is identified by the behavior identification unit 53, and predicts a future behavior of the person. Further, the behavior prediction unit 54 transmits a prediction result to a terminal of an administrator or displays the prediction result on a display or the like.

Figure 19:
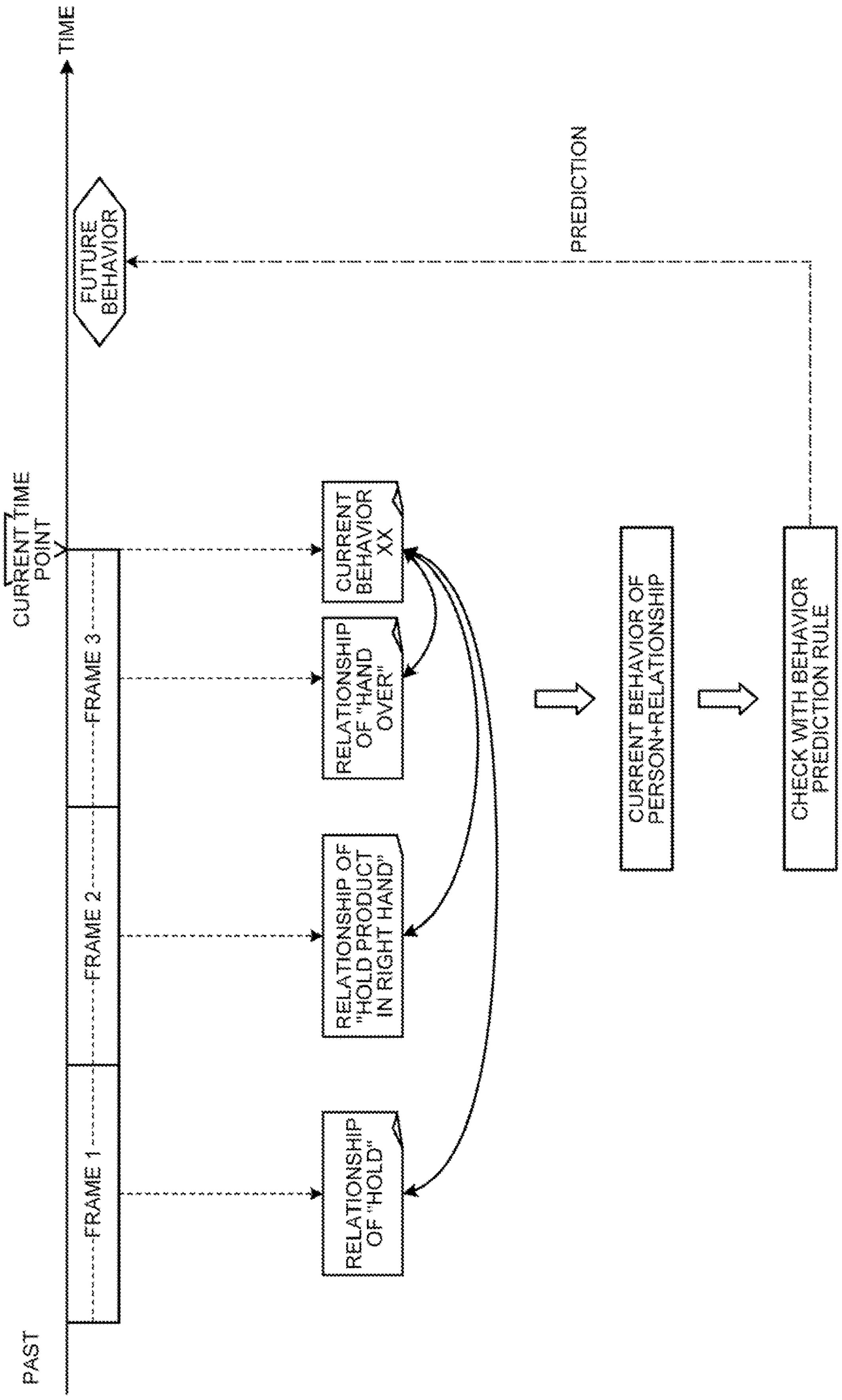
FIG. 19 is a diagram for explaining prediction of a behavior of a person.

FIG. 19 is a diagram for explaining prediction of a behavior of a person. As illustrated in FIG. 19, the behavior prediction unit 54 acquires, at the time of the frame 1, a relationship of “hold” that is identified at the same time point, acquires, at the time of the frame 2, a relationship of “hold product in right hand” that is identified at the same time point, and acquires, at the time point of the frame 3, the relationship of “hold” that is identified at the same time point and the current behavior XX. Then, the behavior prediction unit 54 searches through the behavior prediction rule 28 by using the latest relationship and the current behavior XX, and predicts a behavior of the person. Meanwhile, the relationship described above is only one example, and if the HOID model is used, a relationship that can identify “what is done by whom”, such as “person A holds product B”, is identified.

For example, explanation will be given using the example illustrated in FIG. 8, if the current behavior is “holding product A in hand” and the relationship is “hold”, the behavior prediction unit 54 predicts a behavior of “purchase product A ten minutes later than now”. Further, if the current behavior is “following” and the relationship is “stalking”, the behavior prediction unit 54 predicts a behavior of “attack to a person”.

Furthermore, the example has been explained in FIG. 19 in which the behavior prediction unit 54 performs the behavior prediction by using the current behavior and the latest facial expression, but embodiments are not limited to this example. As described above, the facial expression of the person is largely affected by a change of the internal state of the person, and therefore, a latest behavior does not always represent a current facial expression. Therefore, as illustrated in FIG. 19, the behavior prediction unit 54 may perform the behavior prediction by using the current behavior that is identified from the latest frame 3 and at least one of relationships that are recognized before the frame 3 or a change of the relationships from the frame 1 to the frame 3.

In this case, if the current behavior is identified by a first frame that is one example of image data at a certain time, and if the relationship is identified by a second frame, the behavior prediction unit 54 determines whether the second frame is detected in a certain range corresponding to a certain number of frames or a certain period of time that is set in advance from the time point at which the first frame is detected. Then, if the behavior prediction unit 54 determines that the second frame is detected in the certain range that is set in advance, the behavior prediction unit 54 predicts a future behavior or a future state of the person on the basis of the behavior of the person included in the first frame and the relationship included in the second frame.

In other words, the behavior prediction unit 54 predicts a future behavior or a future state of the person by using a current behavior and a relationship that are detected at certain times that are close to each other to some extent. Meanwhile, the range that is set in advance may be set arbitrarily, and either of the current behavior and the relationship may be identified first.

Flow of Process

Figure 20:
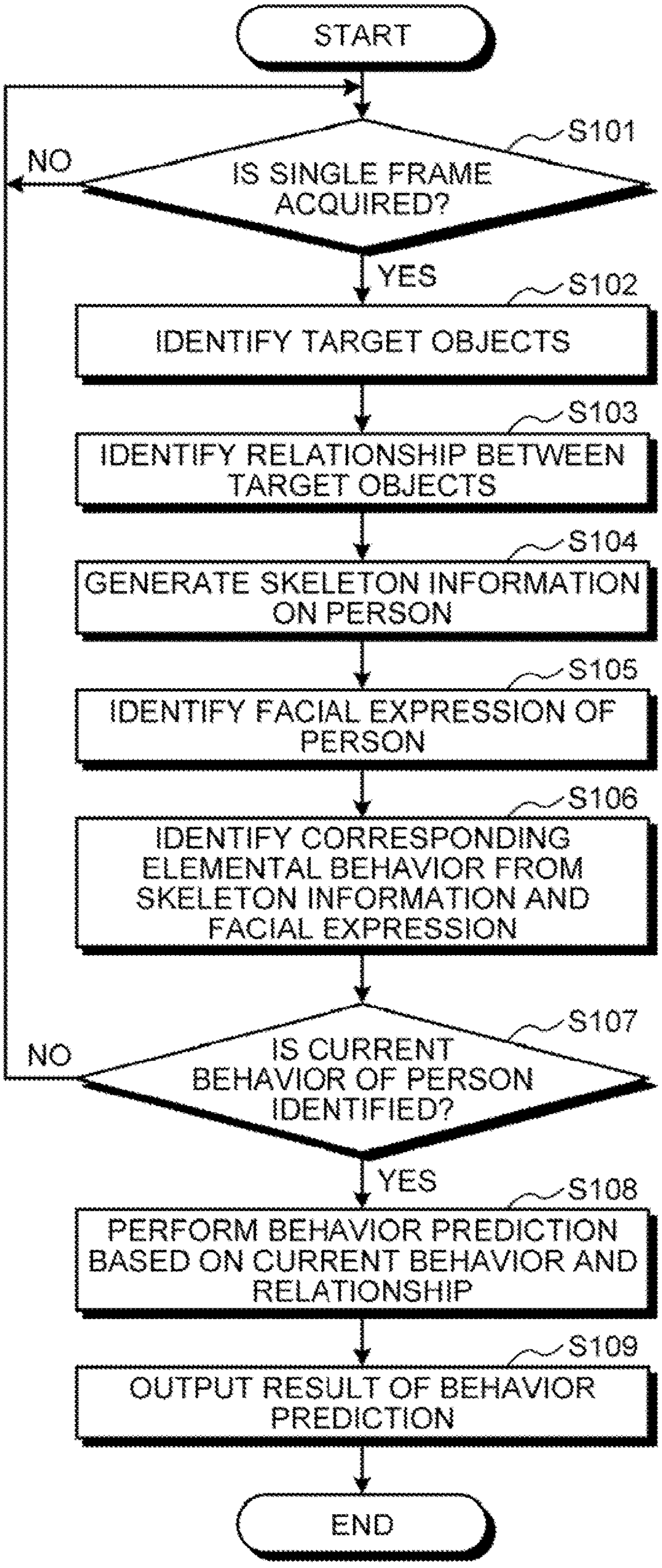
FIG. 20 is a flowchart illustrating the flow of a behavior prediction process.

FIG. 20 is a flowchart illustrating the flow of the behavior prediction process. Meanwhile, in this example, it is assumed that pre-processing is already completed. As illustrated in FIG. 20, if the operation processing unit 50 acquires a single frame (S101: Yes), the operation processing unit 50 inputs the frame to the relationship model 23, identifies target objects that appear in the frame on the basis of an output result of the relationship model 23 (S102), and identifies a relationship between the target objects (S103).

Then, the operation processing unit 50 inputs the frame to the skeleton recognition model 24, and acquires the skeleton information on the person, which indicates an action of each of the parts, for example (S104). Meanwhile, if a person does not appear in the frame at S103, the operation processing unit 50 omits S104.

Further, the operation processing unit 50 inputs the frame to the facial expression recognition model 25, and identifies a facial expression of the person from the output result and the facial expression recognition rule 26 (S105). Meanwhile, if a person does not appear in the frame at S103, the operation processing unit 50 omits S105.

Thereafter, the operation processing unit 50 identifies an elemental behavior from the higher-level behavior identification rule 27 by using the skeleton information on the person and the facial expression of the person (S106). Here, if the current behavior of the person is not identified (S107: No), the operation processing unit 50 repeats the process from S101 with respect to a next frame.

In contrast, if the current behavior of the person is identified (S107: Yes), the operation processing unit 50 searches through the behavior prediction rule 28 by using the current behavior and the identified relationship, and predicts a future behavior of the person (S108). Thereafter, the operation processing unit 50 outputs a result of the behavior prediction (S109).

SPECIFIC EXAMPLES

Specific examples of solutions that contribute to achievement of a safe and secure society using the behavior prediction performed by the information processing apparatus 10 as described above will be described below. Here, a solution using a relationship between a person and an object and a solution using a relationship between a person and another person will be described.

Solution Using Relationship Between Person and Object

Figure 21:
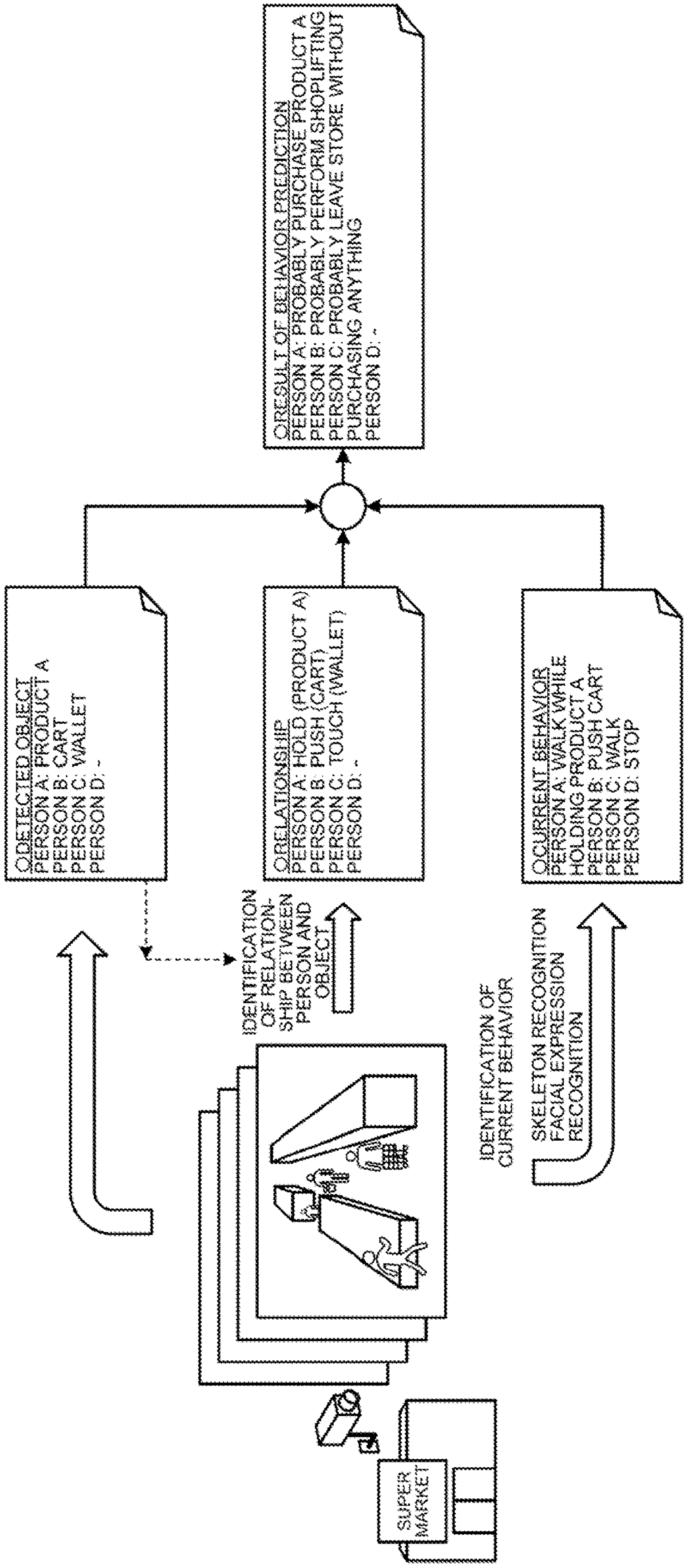
FIG. 21 is a diagram for explaining an example of a solution to which behavior prediction related to a person and an object is adopted.

FIG. 21 is a diagram for explaining an example of a solution to which the behavior prediction related to a person and an object is applied. In FIG. 21, an example of the behavior prediction using video data that is captured by a monitoring camera installed in a supermarket or the like will be described. Meanwhile, processes described below are performed on a single frame or a plurality of frames in a single piece of video data.

As illustrated in FIG. 21, with use of the relationship model 23, the information processing apparatus 10 identifies, from a frame in the video data, information on persons and objects, such as “person A and product A, person B and cart, person C and wallet, and person D”, and information on relationships, such as “relationship of “hold” of person A with respect to product A”, “relationship of “push” of person B with respect to cart”, and “relationship of “touch” of person C with respect to wallet”. Here, a relationship with the person D is not identified because an object is not detected.

Furthermore, the information processing apparatus 10 performs skeleton recognition using the skeleton recognition model 24 and facial expression recognition using the facial expression recognition model 25, and identifies a current behavior of the person A, such as “holding product A”, a current behavior of the person B, such as “push cart”, a current behavior of the person C, such as “walk”, and a current behavior of the person D, such as “stop”, by using recognition results.

Then, the information processing apparatus 10 performs behavior prediction using the current behaviors and the relationships, and predicts a future behavior of the person A, such as "probably purchase product A", a future behavior of the person B, such as "probably perform shoplifting", and a future behavior of the person C, such as "probably leave store without purchasing anything". Here, the person D is excluded from targets of the behavior prediction because the relationship is not identified.

In other words, the information processing apparatus 10 identifies a customer who moves in an area of a product shelf that is a predetermined area in the video data and a target product to be purchased by the customer, identifies, as the relationship, a type of a behavior (for example, watch, hold, or the like) of the customer with respect to the product, and predicts a behavior (for example, purchase, shoplifting, or the like) related to purchase of the product by the customer.

In this manner, the information processing apparatus 10 is able to use the behavior prediction as described above for an analysis of a purchase behavior, such as a behavior or a route that leads to a purchase, or a purchase marketing. Furthermore, the information processing apparatus 10 is able to detect a person, such as the person B, who is likely to commit a crime, such as shoplifting, and contribute to prevention of a crime by strengthening surveillance of the person.

Solution Using Relationship Between Person and Another Person

Figure 22:
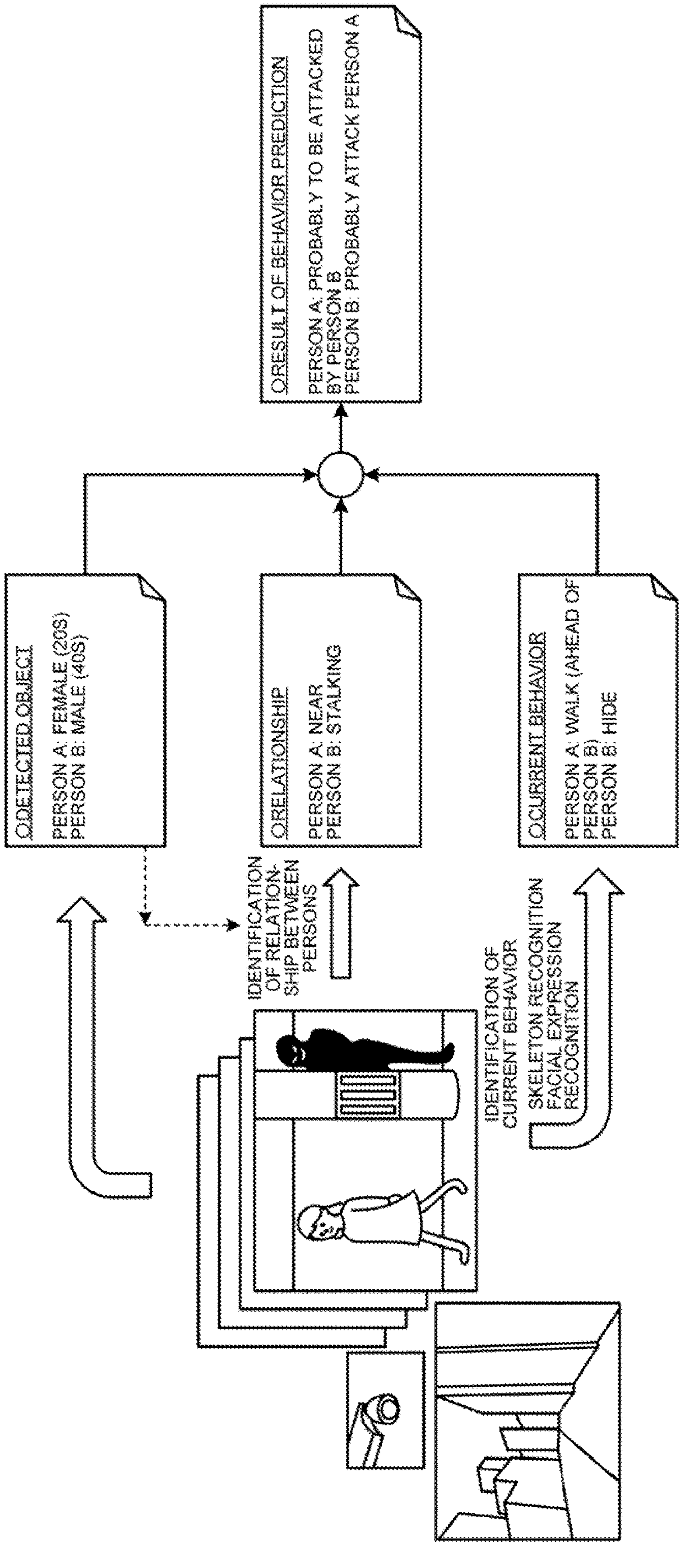
FIG. 22 is a diagram for explaining an example of a solution to which behavior prediction related to a person and another person is adopted.

FIG. 22 is a diagram for explaining an example of a solution to which behavior prediction related to a person and another person is applied. In FIG. 22, an example of the behavior prediction using video data that is captured at night by a monitoring camera installed on a street will be described. Meanwhile, processes described below are performed on a single frame or a plurality of frames in a single piece of video data.

As illustrated in FIG. 22, with use of the relationship model 23, the information processing apparatus 10 identifies, from a frame in the video data, information on persons, such as "person A (female: 20*s*) and person B (male: 40*s*)" and information on relationships, such as "relationship of "near" of person A with respect to person B" and "relationship of "stalking" of person B with respect to person A".

Furthermore, the information processing apparatus 10 performs skeleton recognition using the skeleton recognition model 24 and facial expression recognition using the facial expression recognition model 25, and identifies a current behavior of the person A, such as "walk ahead of person B", and a current behavior of the person B, such as "hide".

Then, the information processing apparatus 10 performs behavior prediction using the current behaviors and the relationships, and predicts a future behavior of the person A, such as "probably to be attacked by person B", and a future behavior of the person B, such as "probably attack person A".

In other words, by assuming that the person A is a victim and the person B is a committer, the information processing apparatus 10 is able to predict a criminal activity of the person B with respect to the person A, from the relationship of "stalking" of the committer with respect to the victim. As a result, the information processing apparatus 10 is able to detect a place where a crime is likely to be committed through the behavior prediction as described above, and implement a countermeasure, such as calling the police or the like. Furthermore, it is possible to contribute to examination on countermeasures, such as an increase of street lights, in the place as described above.

Effects

As described above, the information processing apparatus 10 is able to predict a sign, instead of an occurrence of an accident or a crime, so that it is possible to detect a situation in which a countermeasure is needed in advance from video data. Further, the information processing apparatus 10 is able to perform behavior prediction from video data that is captured by a general camera, such as a monitoring camera, so that the information processing apparatus 10 may be introduced into an existing system without a need of a complicated system configuration or a new apparatus. Furthermore, the information processing apparatus 10 is introduced into an existing system, so that it is possible to reduce a cost as compared to construction of a new system. Moreover, the information processing apparatus 10 is able to predict not only a simple behavior that is continued from past or current behaviors, but also a complicated behavior of a person that is not identified simply from past and current behaviors. With this configuration, the information processing apparatus 10 is able to improve prediction accuracy of a future behavior of a person.

Furthermore, the information processing apparatus 10 is able to implement the behavior prediction using two-dimensional image data without using three-dimensional image data or the like, so that it is possible to increase a speed of a process, as compared to a process using a laser sensor or the like that is recently used. Moreover, the information processing apparatus 10 is able to rapidly detect a situation in which a countermeasure is needed in advance, with the high-speed process.

[b] Second Embodiment

While the embodiment of the present invention has been described above, the present invention may be embodied in various forms other than the above-described embodiment.

Numerals Etc.

Numerical examples, the number of cameras, label names, examples of the rules, examples of the behaviors, examples of the states, a form and contents of the behavior prediction rule, and the like used in the embodiment as described above are mere examples, and may be arbitrarily changed. Furthermore, the flow of the processes described in each of the flowcharts may be appropriately changed as long as no contradiction is derived. Moreover, the store is described as an example in the embodiment as described above, but embodiments are not limited to this example, and the technology may be applied to, for example, a warehouse, a factory, a classroom, inside of a train, inside of a plane, or the like. Meanwhile, the relationship model 23 is one example of a first machine learning model, the skeleton recognition model 24 is one example of a second machine learning model, and the facial expression recognition model 25 is one example of a third machine learning model.

System

The processing procedures, control procedures, specific names, and information including various kinds of data and parameters illustrated in the above-described document and drawings may be arbitrarily changed unless otherwise specified.

Furthermore, the components illustrated in the drawings are functionally conceptual and do not necessarily have to be physically configured in the manner illustrated in the drawings. In other words, specific forms of distribution and integration of the apparatuses are not limited to those illustrated in the drawing. In other words, all or part of the apparatuses may be functionally or physically distributed or integrated in arbitrary units depending on various loads or use conditions.

Moreover, for each processing function performed by each apparatus, all or any part of the processing function may be implemented by a central processing unit (CPU) and a program analyzed and executed by the CPU or may be implemented as hardware by wired logic.

Hardware

Figure 23:
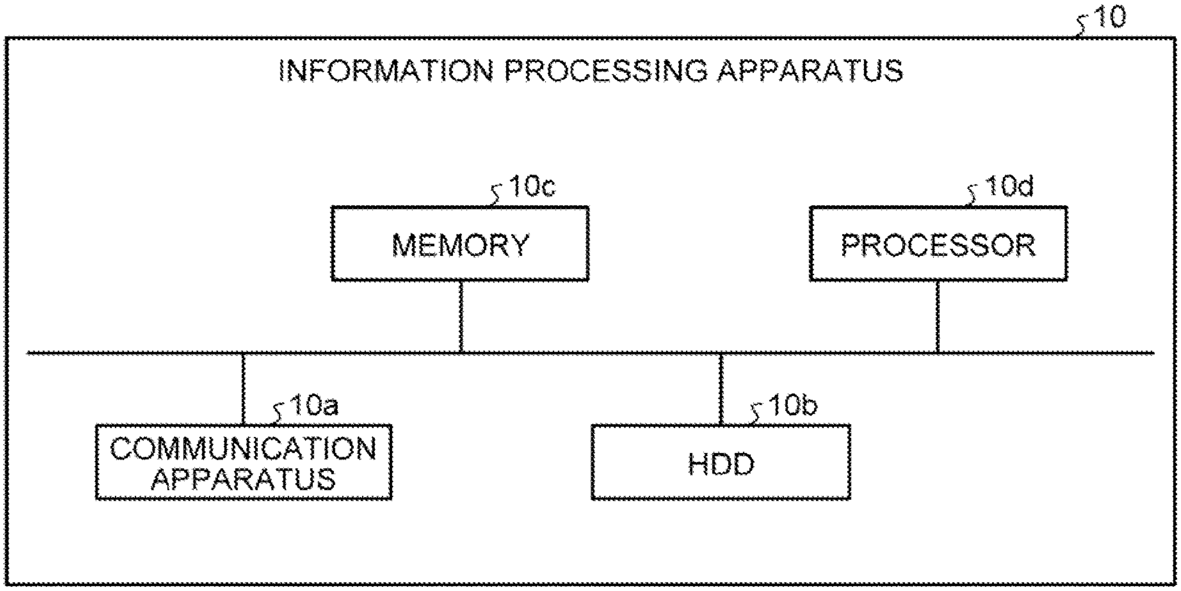
FIG. 23 is a diagram for explaining a hardware configuration example.

FIG. 23 is a diagram for explaining a hardware configuration example. As illustrated in FIG. 23, the information processing apparatus 10 includes a communication apparatus 10*a*, a hard disk drive (HDD) 10*b*, a memory 10*c*, and a processor 10*d*. All of the units illustrated in FIG. 23 are connected to one another via a bus or the like.

The communication apparatus 10*a* is a network interface card or the like and performs communication with a different apparatus. The HDD 10*b* stores therein a program and a DB for operating the functions as illustrated in FIG. 4.

The processor 10*d* reads a program that performs the same process as each of the processing units illustrated in FIG. 4 from the HDD 10*b* or the like and loads the program onto the memory 10*c*, so that a process for implementing each of the functions described with reference to FIG. 4 or the like is operated. For example, the process implements the same functions as each of the processing units included in the information processing apparatus 10. Specifically, the processor 10*d* reads a program having the same functions as the pre-processing unit 40, the operation processing unit 50, and the like from the HDD 10*b* or the like. Then, the processor 10*d* performs a process that executes the same processes as the pre-processing unit 40, the operation processing unit 50, and the like.

In this manner, the information processing apparatus 10 functions as an information processing apparatus that reads the program and executes the program to implement a behavior prediction method. Further, the information processing apparatus 10 may cause a medium reading device to read the above-described program from a recording medium and execute the read program as described above to implement the same functions as the embodiment as described above. Meanwhile, the program described in the other embodiments need not always be executed by the information processing apparatus 10. For example, even when a different computer or a server executes the program or when the different computer and the server execute the program in a cooperative manner, the embodiments as described above may be applied in the same manner.

The program may be distributed via a network, such as the Internet. Further, the program may be recorded in a computer-readable recording medium, such as a hard disk, a flexible disk (FD), a compact disc read only memory (CD-ROM), a magneto-optical disk (MO), or a digital versatile disk (DVD), and may be executed by being read from the recording medium by the computer.

According to the embodiments, it is possible to detect a situation in which a countermeasure is needed in advance from video data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process, the process comprising:

storing, in a memory, a behavior identification rule defining a change in an elemental behavior that is identified from changes in basic actions and facial expressions of a target person and that is detected before a certain behavior, and a behavior prediction rule defining a future behavior of a target person based on a current behavior of the target person and a relationship of the target person with respect to a target object;

training a first machine learning model using training data that includes image data used as input data and correct answer information set for the image data;

acquiring video data that includes target objects including the target person and the target object;

first identifying a relationship between the target objects in the acquired video data, by inputting the acquired video data to the trained first machine learning model;

second identifying changes in skeleton information and facial expression information on the target person from respective frames in the video data, and identifying a change in the elemental behavior from the identified changes in the skeleton information and the facial expression information on the target person;

third identifying a current behavior of the target person corresponding to the change in the elemental behavior identified from the video data, in accordance with the behavior identification rule; and searching through the behavior prediction rule to predict the future behavior of the target person corresponding to the current behavior of the target person and the relationship identified from the video data.

2. The non-transitory computer-readable recording medium according to claim 1, wherein the second identifying includes acquiring a second machine learning model in which a parameter of a neural network is changed such that an error between an output result that is output from the neural network when an explanatory variable that is image data is input to the neural network and correct answer data that is a label of an action is reduced;

identifying an action of each of parts of the target person by inputting the video data to the second machine learning model;

acquiring a third machine learning model in which a parameter of the neural network is changed such that an error between an output result that is output from the neural network when an explanatory variable that is image data including a facial expression of the person is input to the neural network and correct answer data that represents an objective variable as a strength of each of markers of a facial expression of the person is reduced;

generating a strength of each of the markers of the target person by inputting the video data to the third machine learning model;

identifying the facial expression of the target person by using the generated strength of the markers; and identifying the current behavior of the target person by comparing the identified action of each of the parts of the target person, the identified facial expression of the target person, and a rule that is set in advance.

3. The non-transitory computer-readable recording medium according to claim 1, wherein the first machine learning model is a model for Human Object Interaction Detection (HOID) that is generated by machine learning so as to identify a first class indicating a person, first area information indicating an area in which the person appears, a second class indicating an object, second area information indicating an area in which the object appears, and a relationship between the first class and the second class, the first identifying includes inputting the video data to the HOID model;

acquiring, as an output of the HOID model, the first class, the first area information, the second class, the second area information, and the relationship between the first class and the second class, with respect to the person and the object that appear in the video data; and identifying a relationship between the target person and the target object based on an acquired result.

4. The non-transitory computer-readable recording medium according to claim 2, wherein the target person is a customer who moves in a predetermined area in the video data, the target object is a target product to be purchased by the customer, the relationship is a type of a behavior of the target person with respect to the product, and the predicting includes predicting, as the future behavior of the target person, a behavior related to a purchase of the product by the customer.

5. The non-transitory computer-readable recording medium according to claim 1, wherein the first machine learning model is a model for Human Object Interaction Detection (HOID) that is generated by machine learning so as to identify a first class indicating a first target person, first area information indicating an area in which the first target person appears, a second class indicating a second target person, second area information indicating an area in which the second target person appears, and a relationship between the first class and the second class, the first identifying includes inputting the video data to the HOID model;

acquiring, as an output of the HOID model, the first class, the first area information, the second class, the second area information, and the relationship between the first class and the second class, with respect to the first target person and the second target person who appear in the video data; and identifying a relationship between the first target person and the second target person based on an acquired result.

6. The non-transitory computer-readable recording medium according to claim 5, wherein the first target person is a committer, the second target person is a victim, the relationship is a type of a behavior of the first target person with respect to the second target person, and the predicting includes predicting, as the future behavior of the target person, a criminal activity of the first target person with respect to the second target person.

7. The non-transitory computer-readable recording medium according to claim 1, wherein the first identifying includes inputting the video data to the first machine learning model;

acquiring, as an output of the first machine learning model, a first class, first area information, a second class, second area information, and a relationship between the first class and the second class, with respect to a first target person and a second target person who appear in the video data; and identifying a relationship between the first target person and the second target person, or identifying a relationship of the first target person and the second target person with the target object, based on an acquired result.

8. An information processing method executed by a computer, the information processing method comprising:

storing, in a memory, a behavior identification rule defining a change in an elemental behavior that is identified from changes in basic actions and facial expressions of a target person and that is detected before a certain behavior, and a behavior prediction rule defining a future behavior of a target person based on a current behavior of the target person and a relationship of the target person with respect to a target object;

training a first machine learning model using training data that includes image data used as input data and correct answer information set for the image data;

acquiring video data that includes target objects including the target person and the target object;

first identifying a relationship between the target objects in the acquired video data, by inputting the acquired video data to the trained first machine learning model;

second identifying changes in skeleton information and facial expression information on the target person from respective frames in the video data, and identifying a change in the elemental behavior from the identified changes in the skeleton information and the facial expression information on the target person;

third identifying a current behavior of the target person corresponding to the change in the elemental behavior identified from the video data, in accordance with the behavior identification rule; and searching through the behavior prediction rule to predict the future behavior of the target person corresponding to the current behavior of the target person and the relationship identified from the video data.

9. An information processing apparatus comprising:

a memory configured to store a behavior identification rule defining a change in an elemental behavior that is identified from changes in basic actions and facial expressions of a target person and that is detected before a certain behavior, and a behavior prediction rule defining a future behavior of a target person based on a current behavior of the target person and a relationship of the target person with respect to a target object; and a processor coupled to the memory and configured to:

train a first machine learning model using training data that includes image data used as input data and correct answer information set for the image data;

acquire video data that includes target objects including the target person and the target object;

identify a relationship between the target objects in the acquired video data, by inputting the acquired video data to the trained first machine learning model;

identify changes in skeleton information and facial expression information on the target person from respective frames in the video data, and identifying a change in the elemental behavior from the identified changes in the skeleton information and the facial expression information on the target person;

identify a current behavior of the target person corresponding to the change in the elemental behavior identified from the video data, in accordance with the behavior identification rule; and search through the behavior prediction rule to predict the future behavior of the target person corresponding to the current behavior of the target person and the relationship identified from the video data.

10. The non-transitory computer-readable recording medium according to claim 1, wherein the computer further executes the process comprising:

tracing the video data back for a predetermined time period from a first frame including the certain behavior to acquire the respective frames to the first frame; and detecting, from the respective frames, the basic actions and the facial expressions of the target person performing the certain behavior, and identifying the changes in the elemental behavior before the certain behavior, thereby generating the behavior identification rule.

* * * * *